Mar. 6, 1923.
J. A. CALDER.
LATCH NEEDLE MAKING MACHINE.
FILED JULY 9, 1919.
1,447,756.
20 SHEETS—SHEET 1.
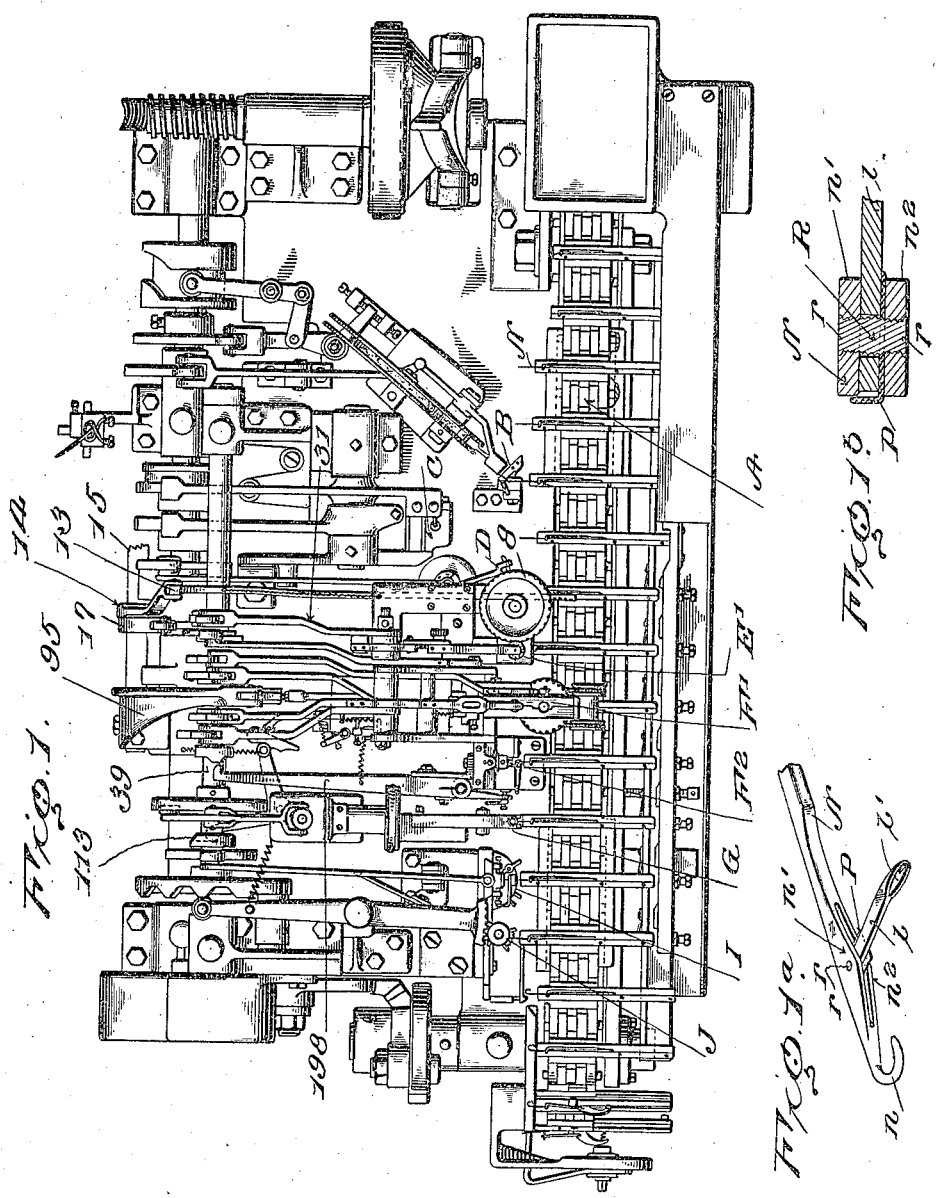
Witness
Helyd Murray
Inventor
John A. Calder
By Sturtevant & Mason
Attorneys

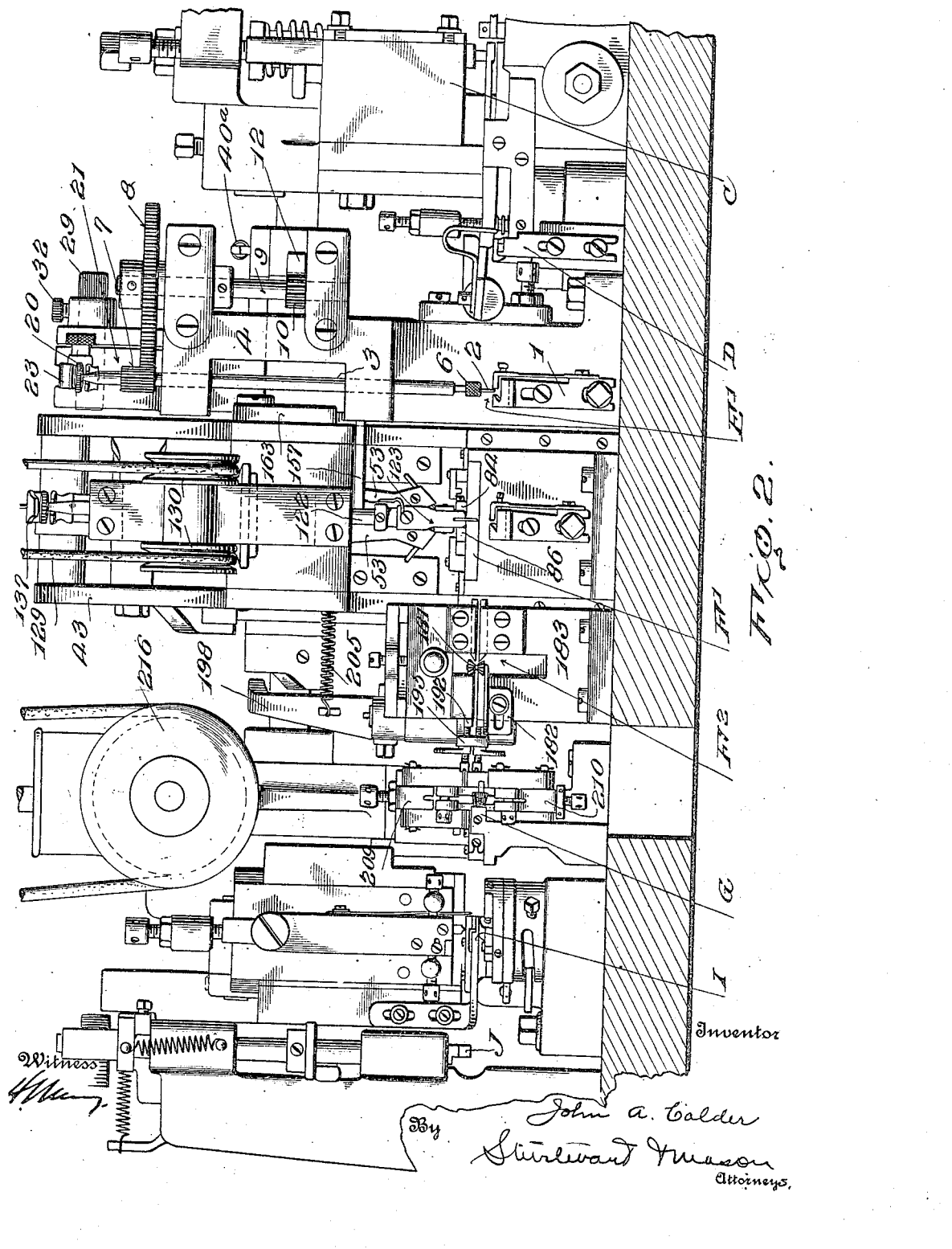

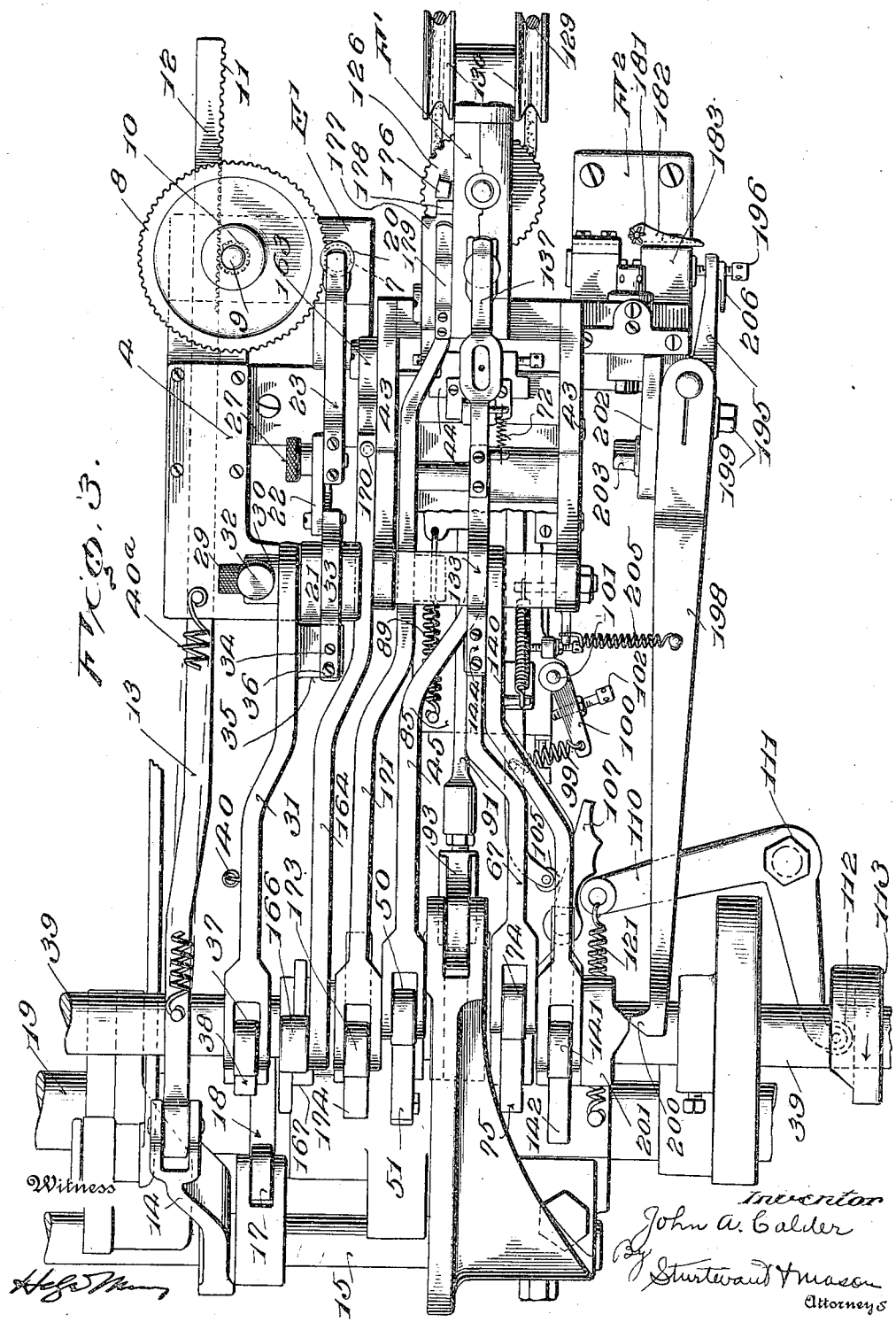

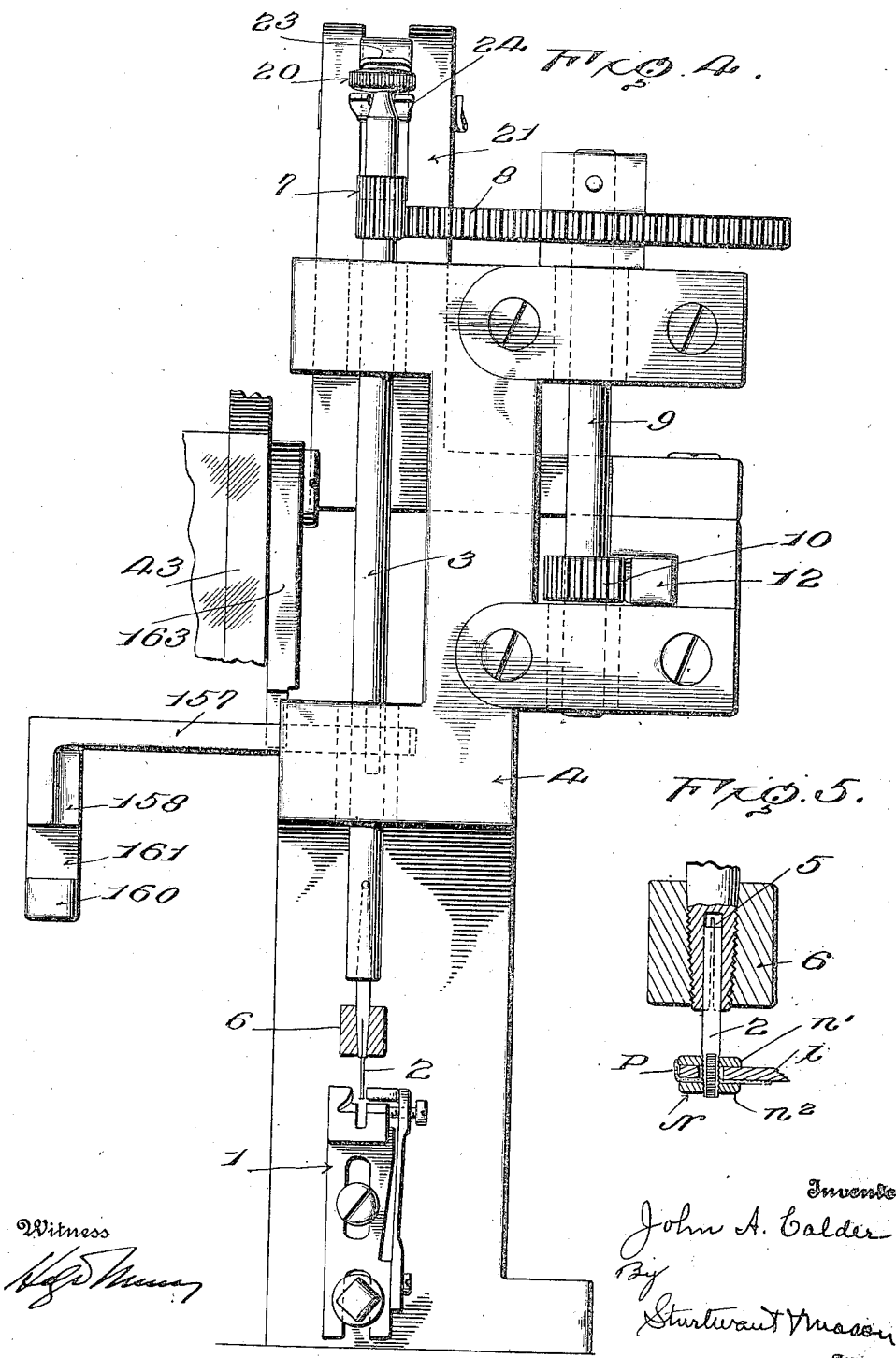

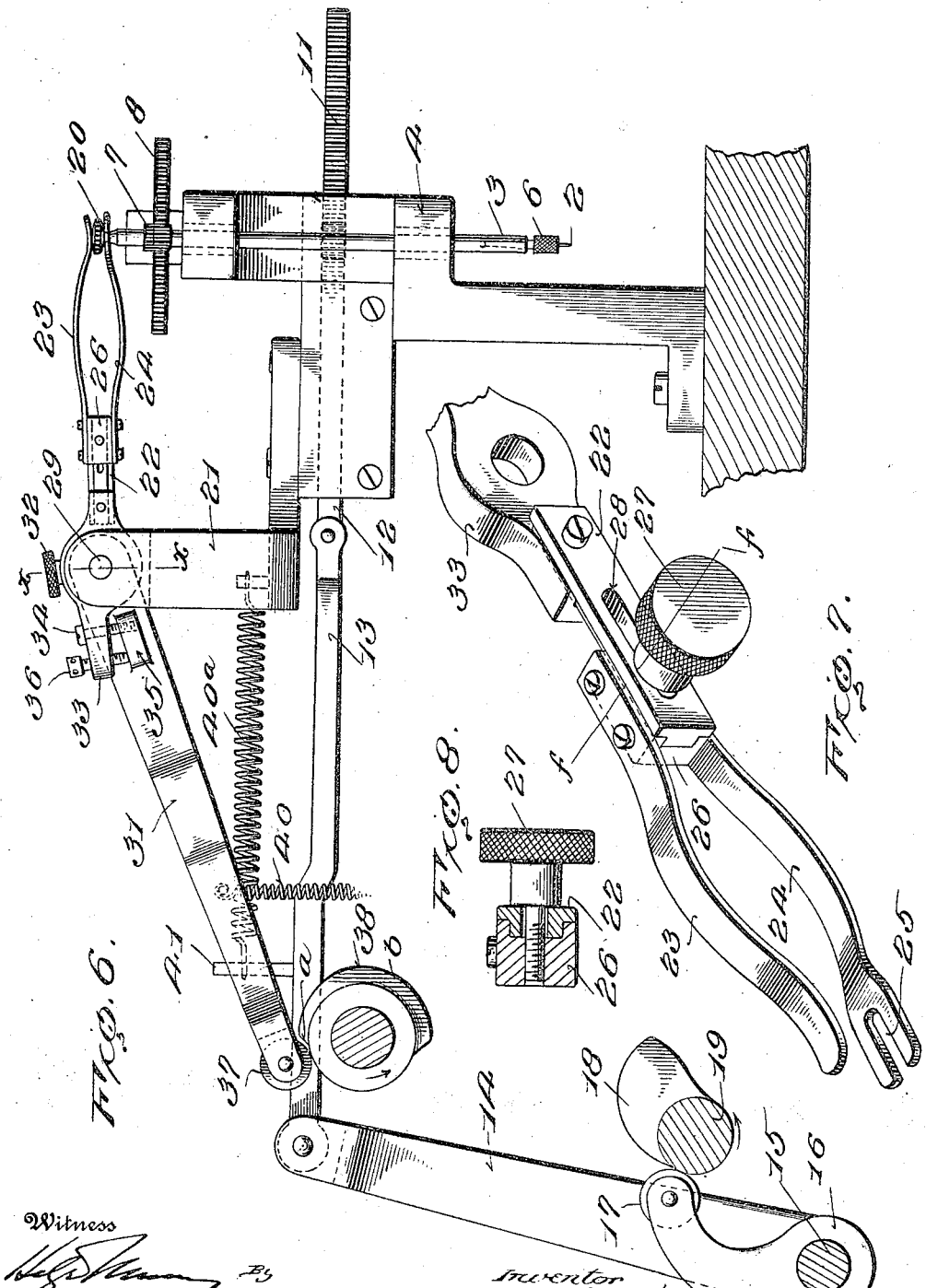

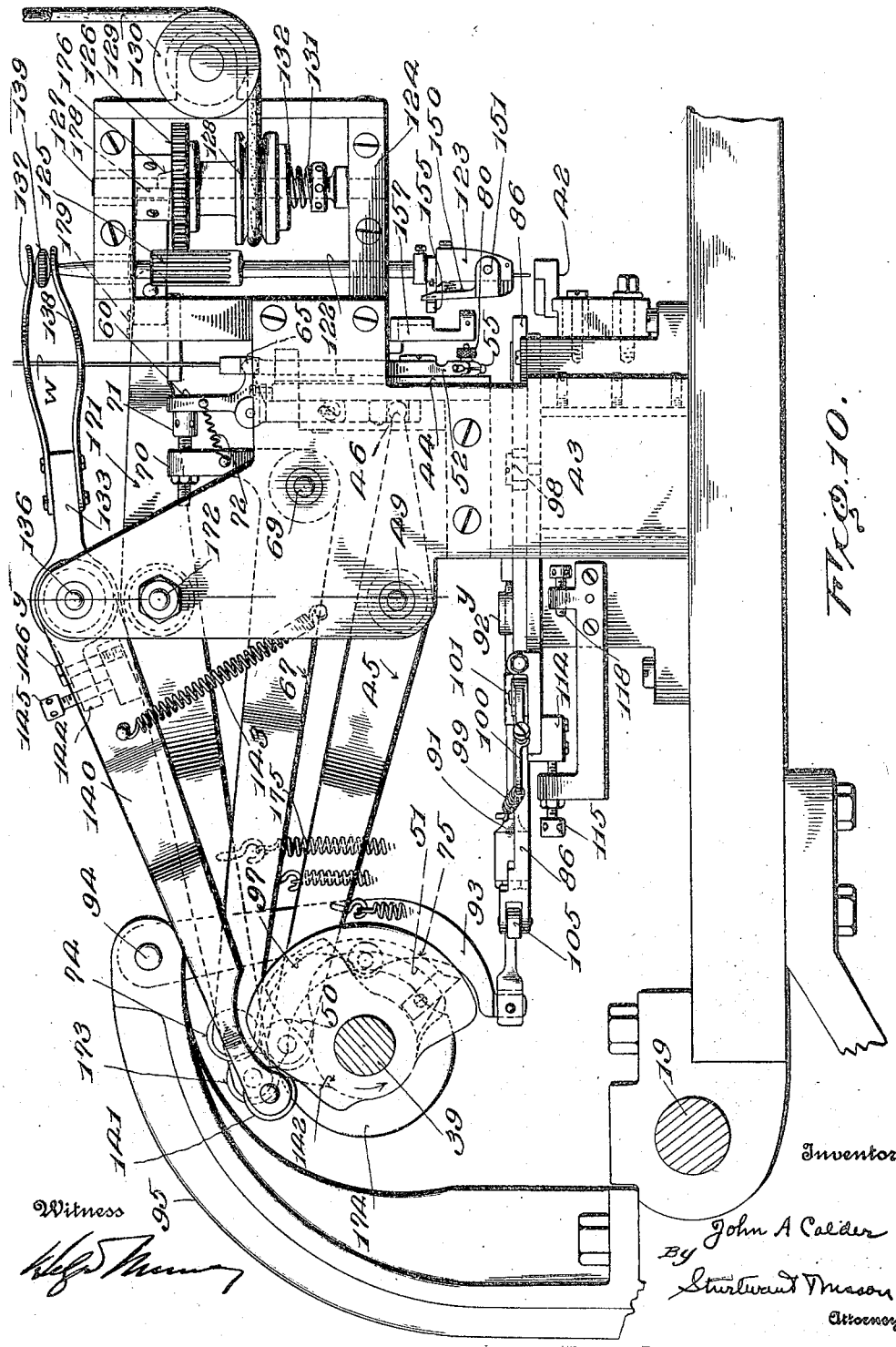

Mar. 6, 1923.

J. A. CALDER.
LATCH NEEDLE MAKING MACHINE.
FILED JULY 9, 1919.

Inventor
John A. Calder
By Sturtevant & Mason
Attorneys

Witness

Mar. 6, 1923.

J. A. CALDER.
LATCH NEEDLE MAKING MACHINE.
FILED JULY 9, 1919.

Witness

Inventor
John A. Calder
By Sturtevant & Hudson
Attorney

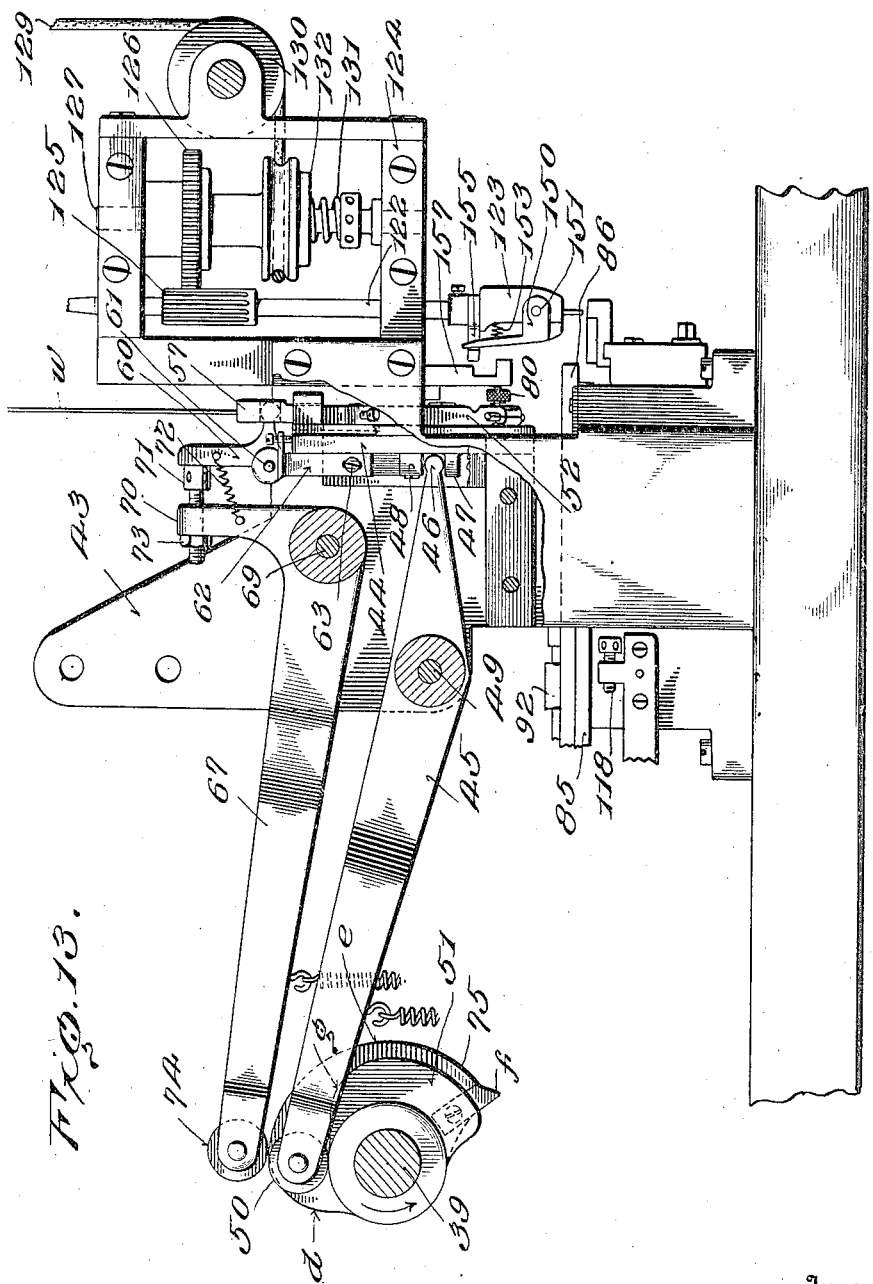

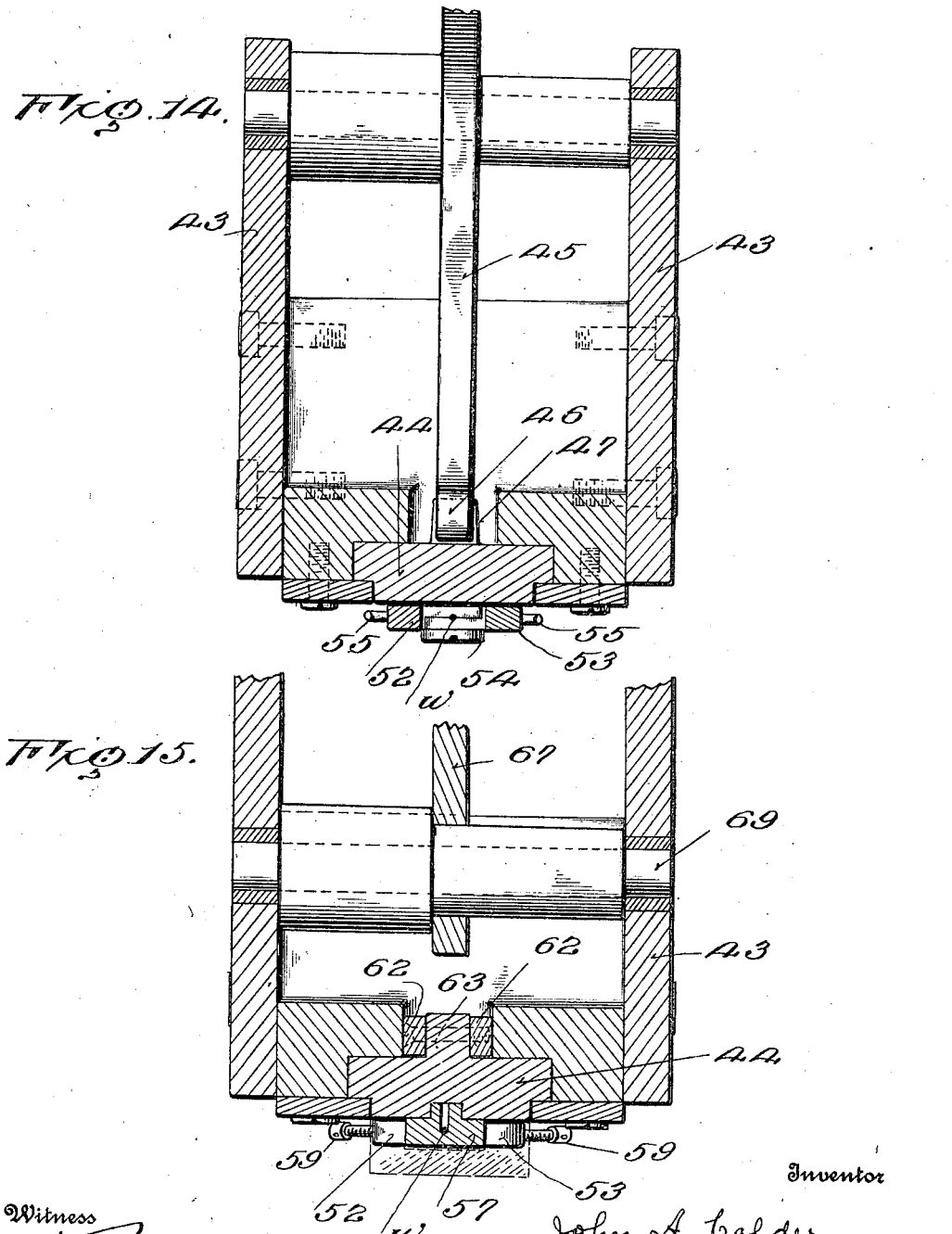

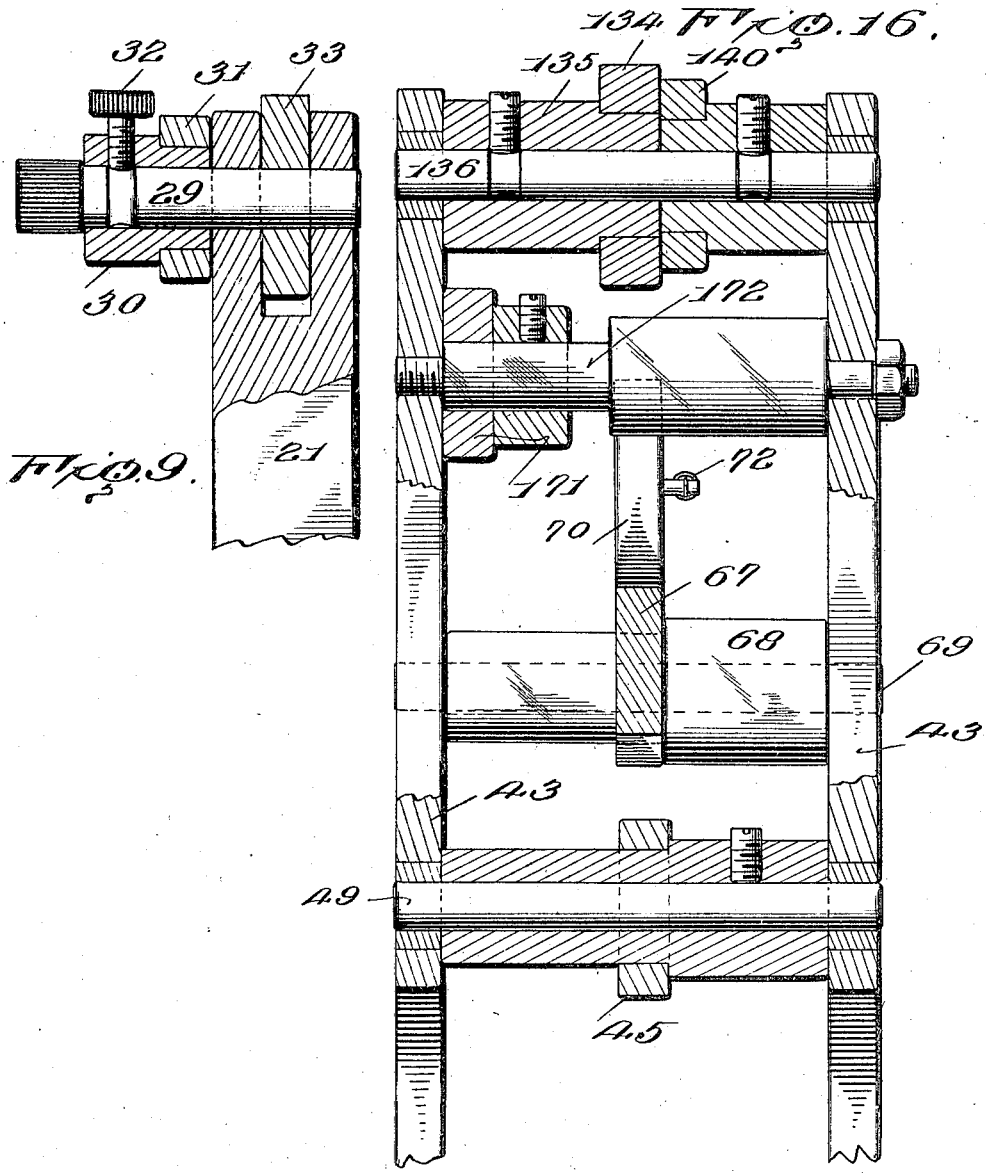

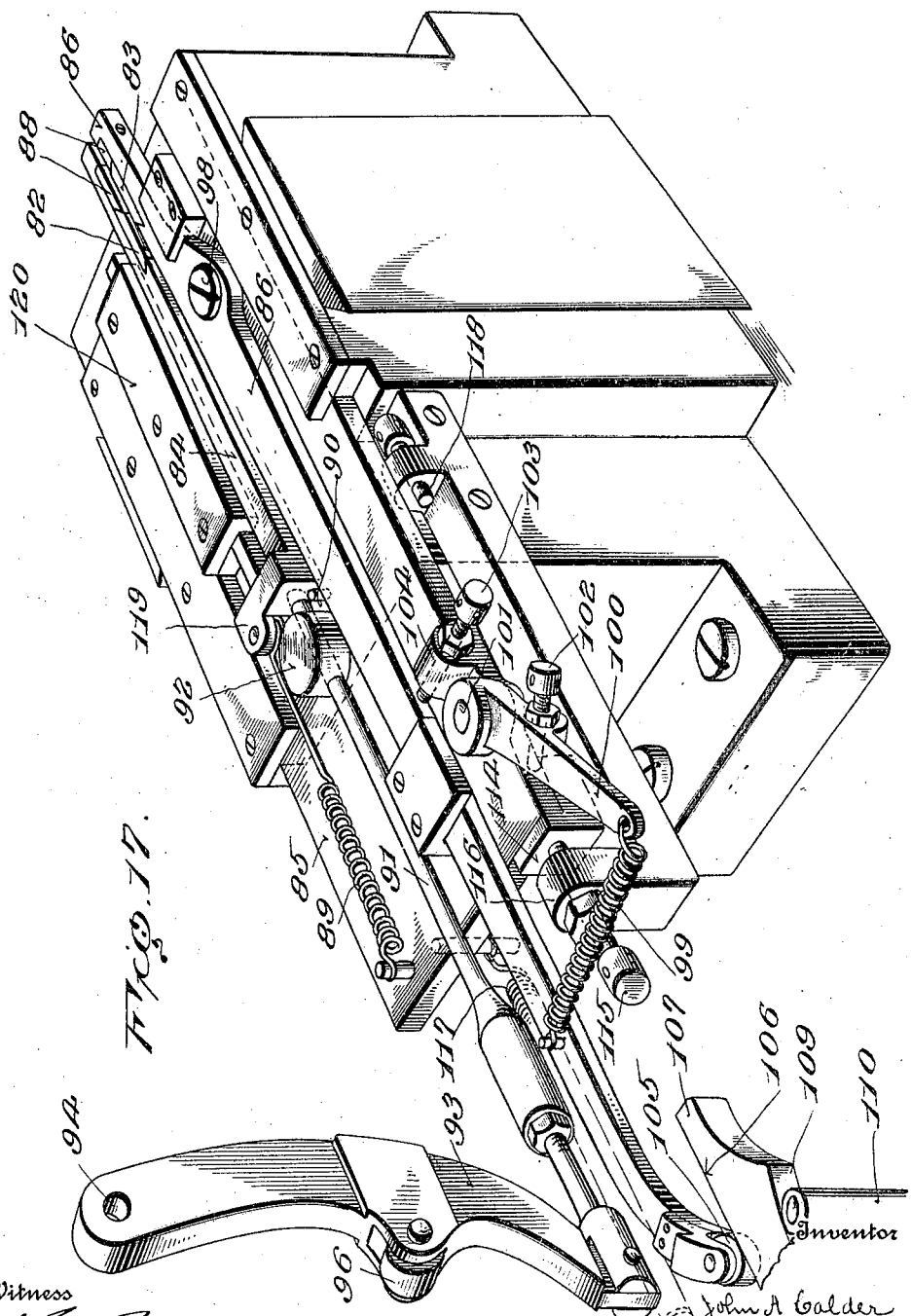

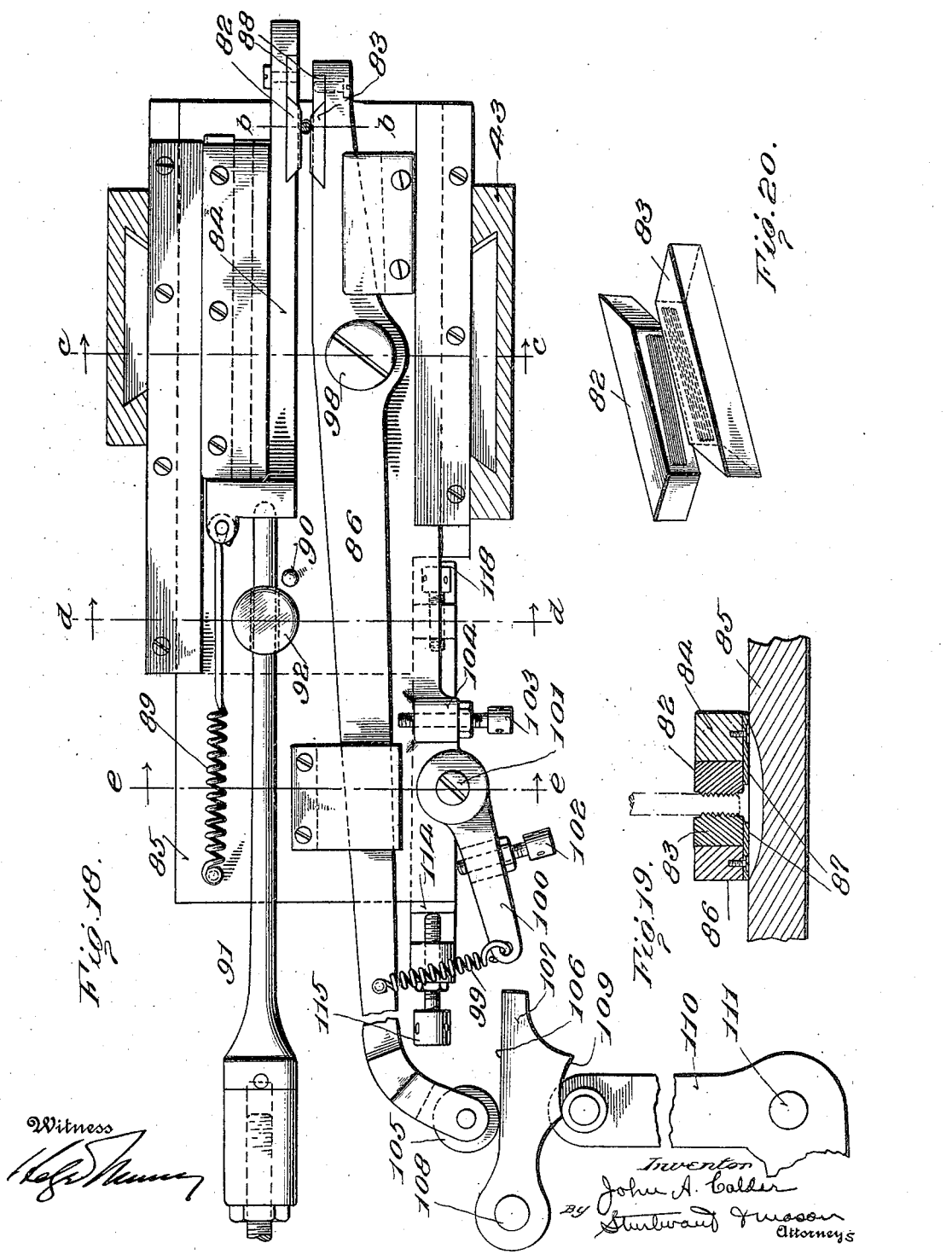

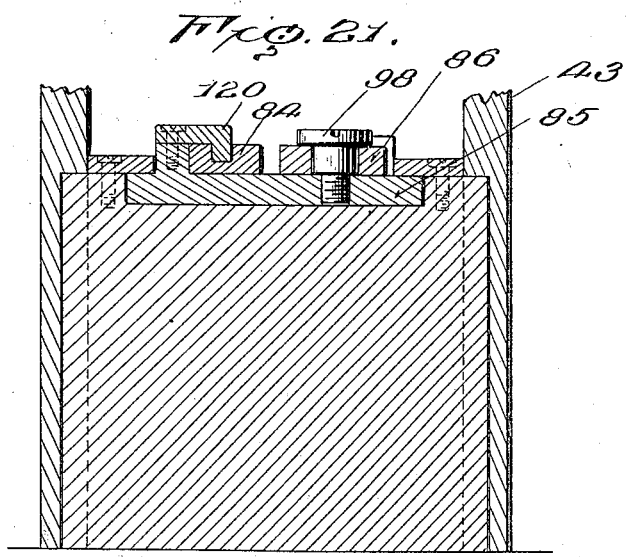
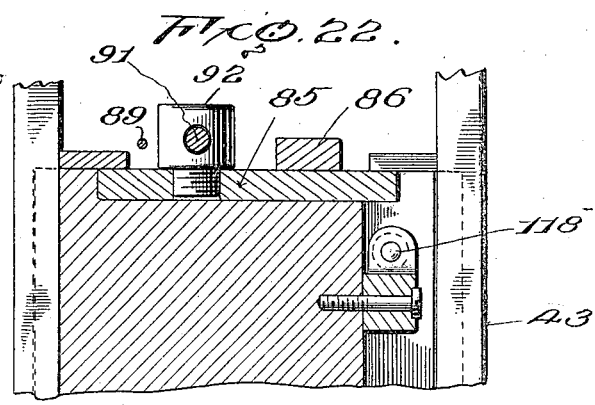
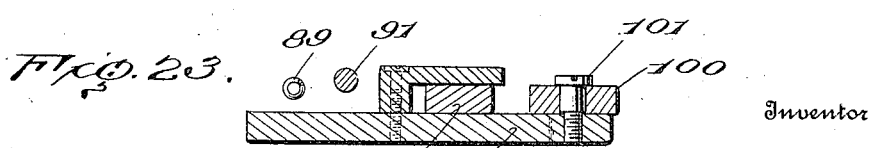

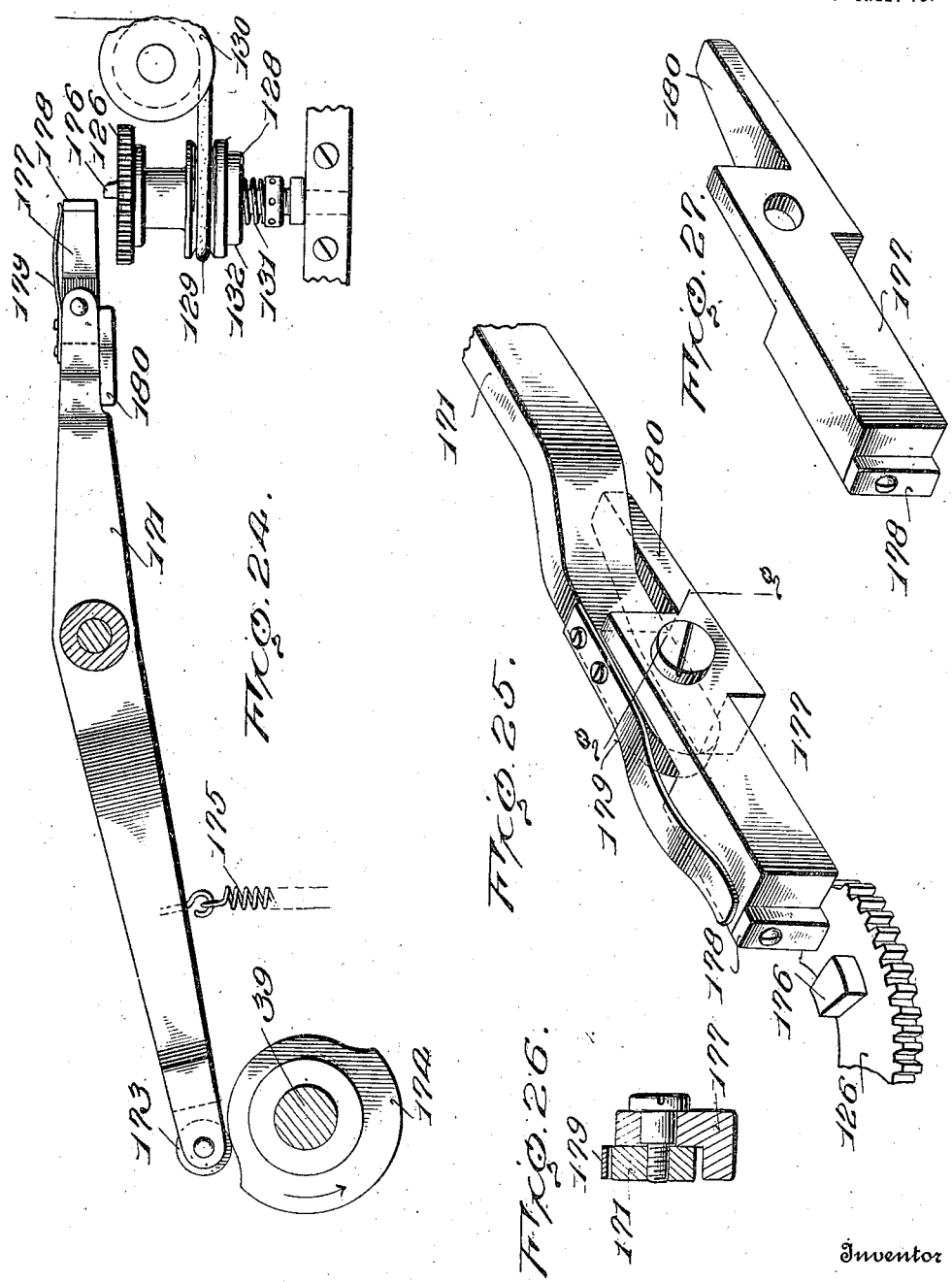

Mar. 6, 1923.
J. A. CALDER.
LATCH NEEDLE MAKING MACHINE.
FILED JULY 9, 1919.
1,447,756.
20 SHEETS—SHEET 16.
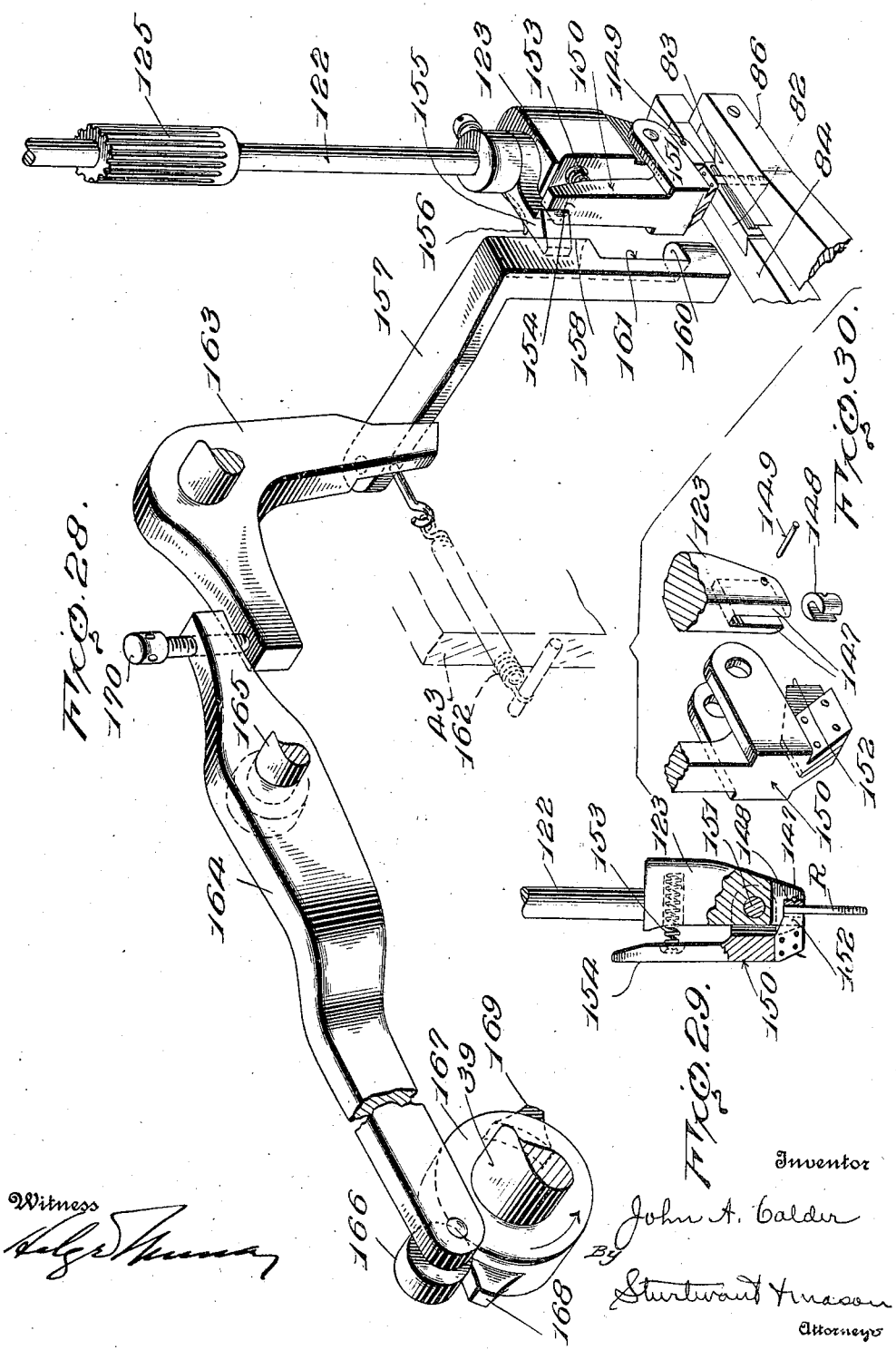
Inventor
John A. Calder
By
Sturtevant & Mason
Attorneys
Witness

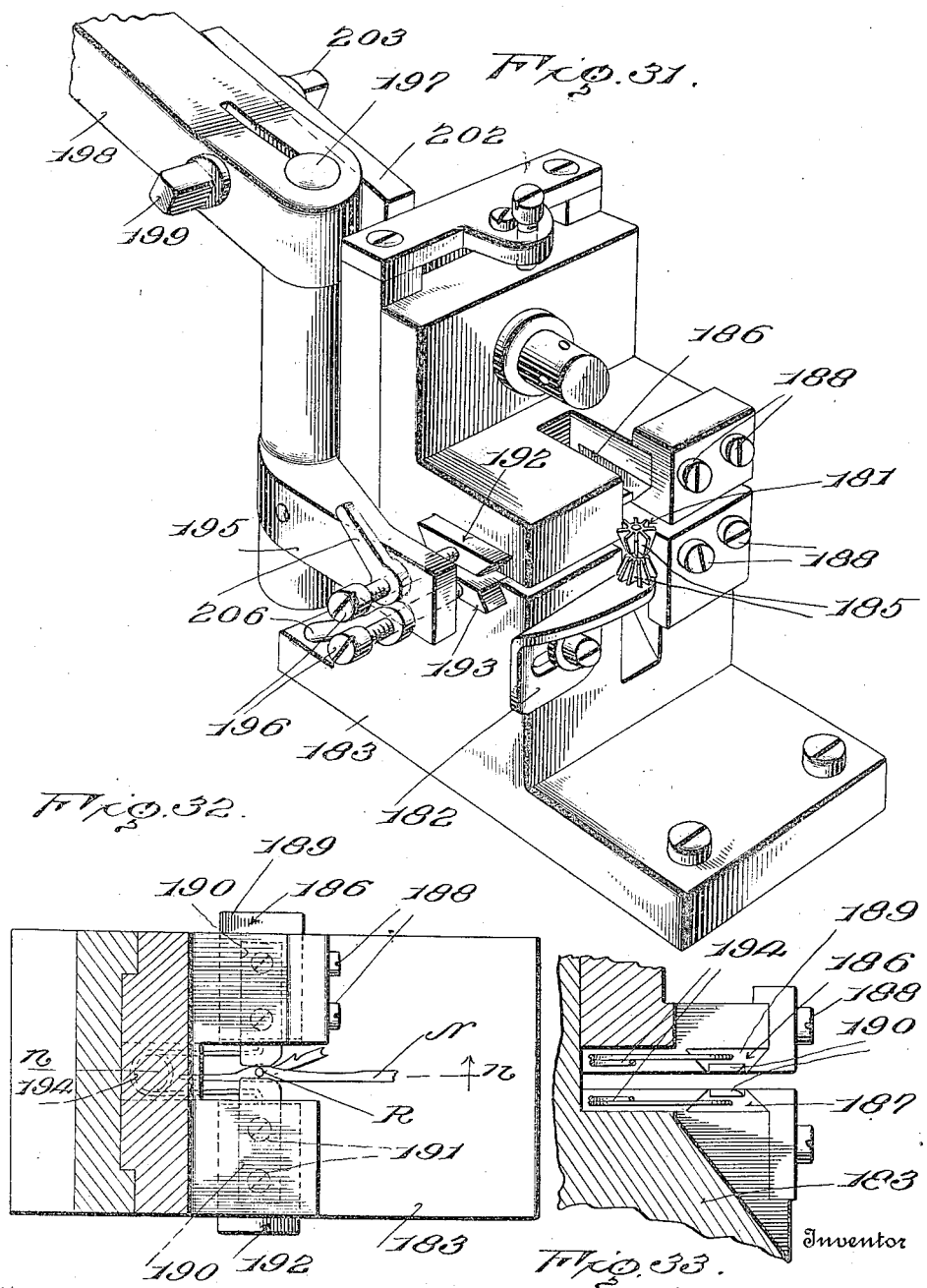

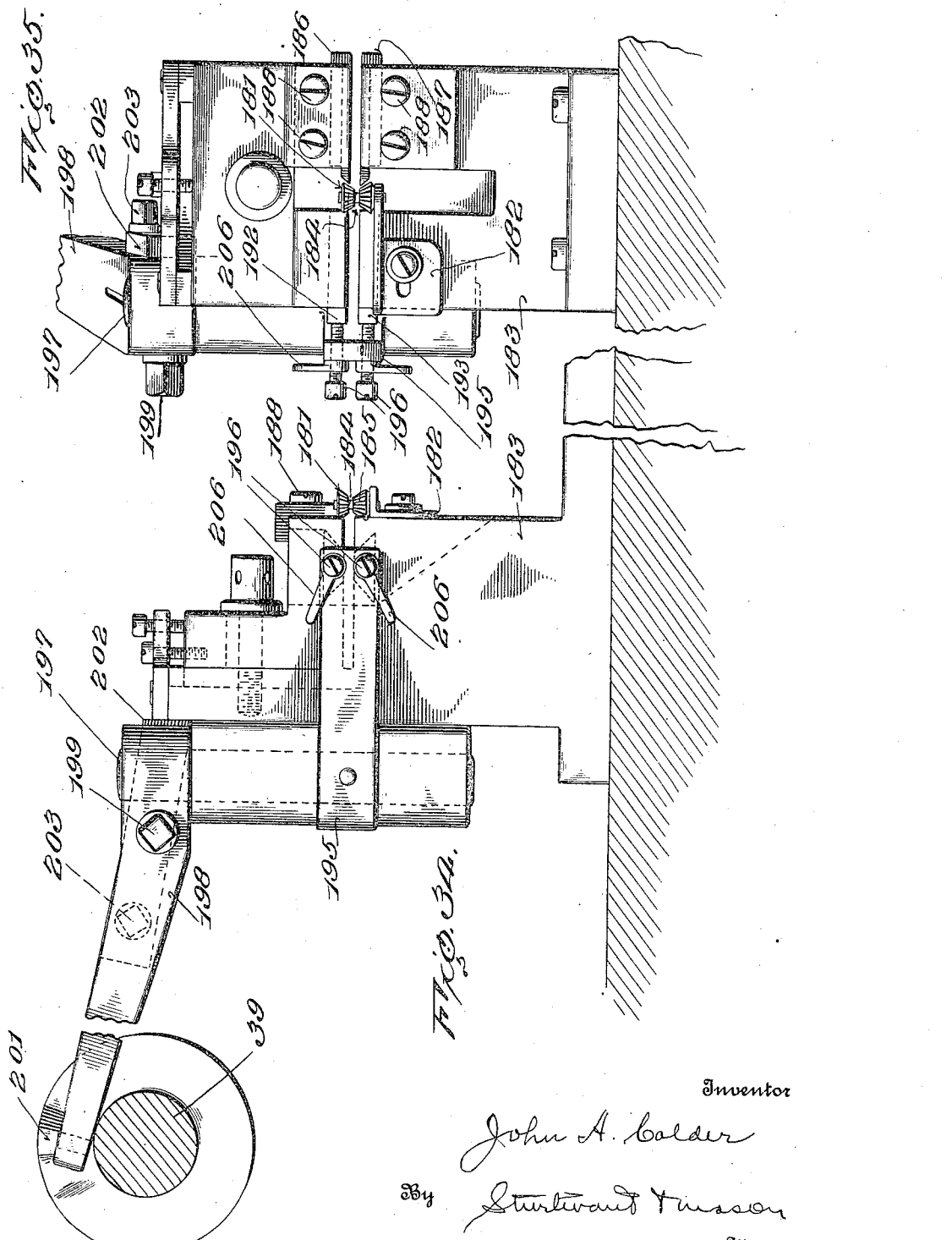

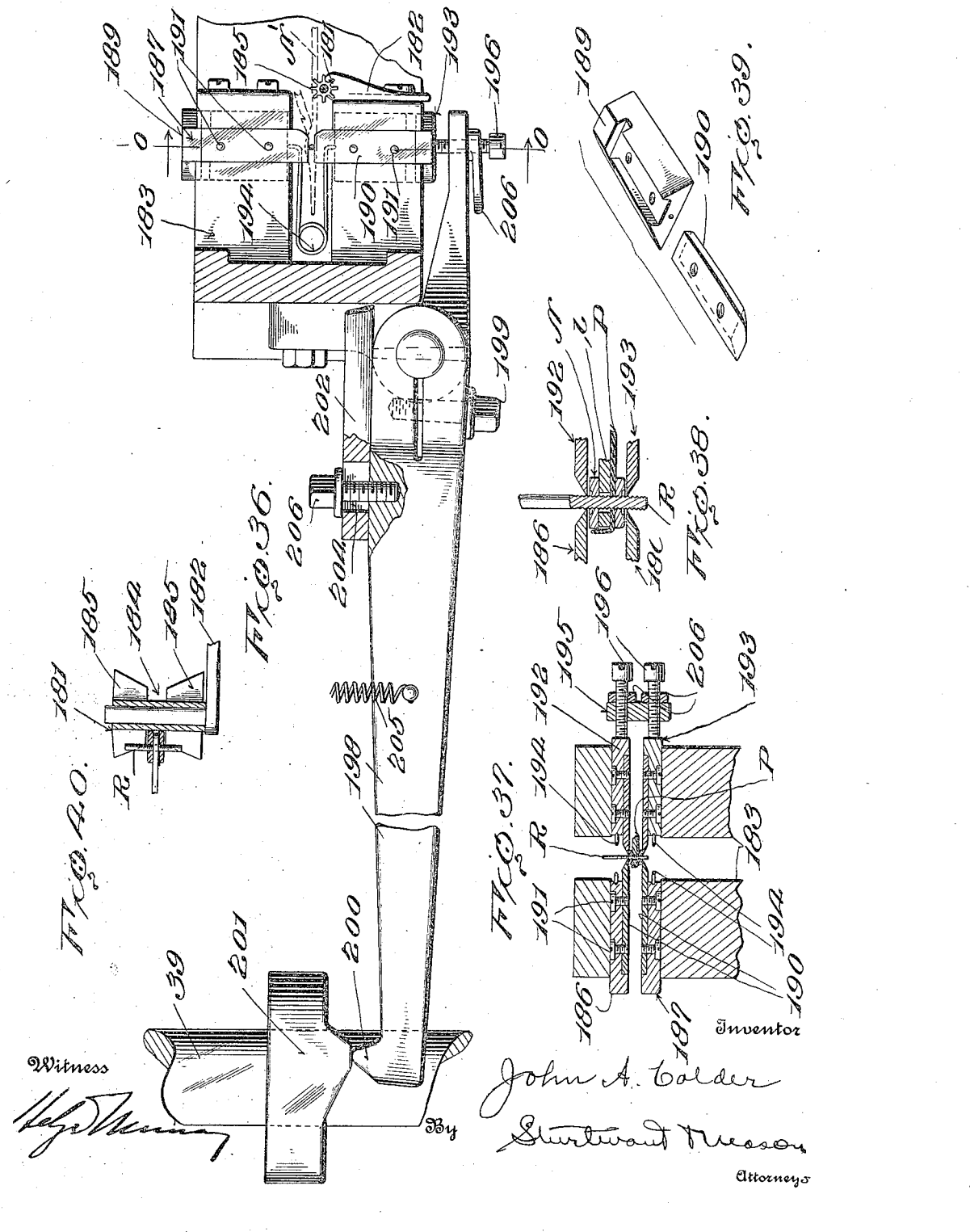

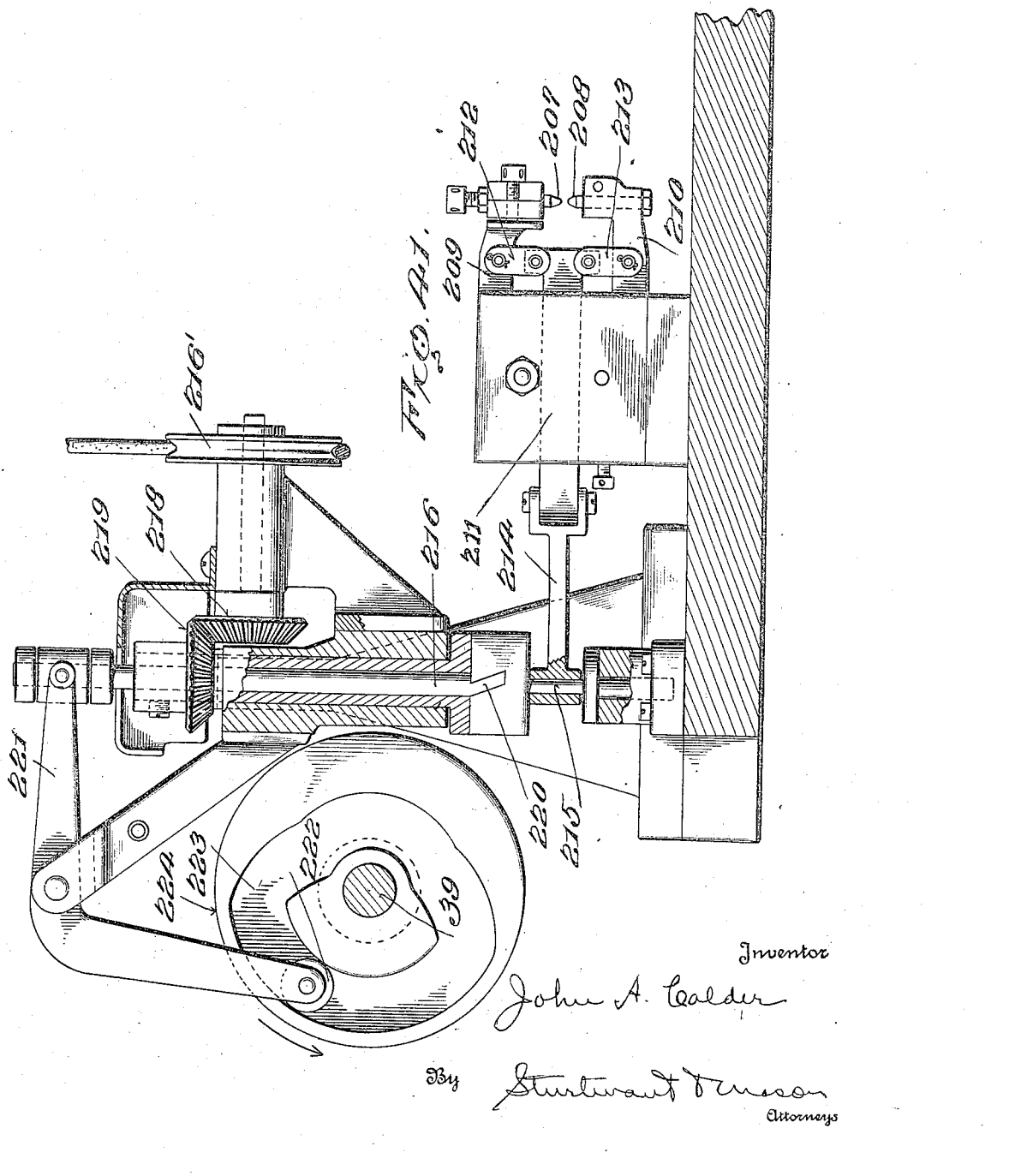

Patented Mar. 6, 1923.

1,447,756

UNITED STATES PATENT OFFICE.

JOHN A. CALDER, OF TORRINGTON, CONNECTICUT, ASSIGNOR TO THE TORRINGTON COMPANY, OF TORRINGTON, CONNECTICUT, A CORPORATION OF CONNECTICUT.

LATCH-NEEDLE-MAKING MACHINE.

Application filed July 9, 1919. Serial No. 309,579.

*To all whom it may concern:*

Be it known that I, JOHN A. CALDER, a citizen of the United States, residing at Torrington, in the county of Litchfield, State of Connecticut, have invented certain new and useful Improvements in Latch-Needle-Making Machines, of which the following is a description, reference being had to the accompanying drawing and to the figures of reference marked thereon.

The invention relates to new and useful improvements in latch needle making machines, and more particularly to a needle having a swinging latch and the means for securing the latch to the body portion of the needle.

An object of the invention is to provide means for inserting a threaded rivet through the cheeks of the needle and the latch and for heading said threaded rivet.

A further object of the invention is to provide a machine of the above character with means for forming the threaded rivet.

A still further object of the invention is to provide a machine of the above character with means for threading the openings in the cheeks of the needle which receive the rivet.

A still further object of the invention is to provide means for forming the rivet from wire stock, threading the rivet and then cutting it to the proper length after it has been threaded into the openings in the cheek of the needle and properly positioned for forming the rivet.

These and other objects will in part be obvious and will in part be hereinafter more fully disclosed.

In the drawings, which show by way of illustration one embodiment of the invention,—

Figure 1 is a plan view showing a latch needle making machine having the improvements embodied therein;

Figure 1ª is a perspective view of a latch needle formed upon the improved machine;

Figure 1ᵇ is a sectional view through the needle and the latch after the latch has been riveted to the needle body proper;

Figure 2 is a front view showing a portion of the machine and particularly the features embodying the present invention;

Figure 3 is a plan view of a portion of the machine also showing the features embodying the present invention;

Figure 4 is a front view of a portion of the machine showing the tapping mechanism for threading the openings in the cheeks of the needle;

Figure 5 is an enlarged detail view in section, showing the lower end of the tapping spindle, the tap and the needle which is being tapped;

Figure 6 is a side view of the tapping spindle and the means for rotating and also for raising and lowering the same showing the shape and timing of the actuating cams therefor;

Figure 7 is a perspective view of the immediate connection between the raising and lowering lever and the tapping spindle;

Figure 8 is a sectional view on the line $f$—$f$ of Figure 7;

Figure 9 is a sectional view on the line $x$—$x$ of Figure 6, looking from the rear of the machine;

Figure 10 is a view in side elevation, showing the mechanism for forming the rivet, threading the rivet and inserting the rivet in the needle;

Figure 13 is a view partly in longitudinal section and partly in side elevation, showing the rivet-forming mechanism and a portion of the means for inserting the rivet in the threaded openings in the needle;

Figure 14 is a sectional view on the line $z$—$z$ of Figure 11;

Figure 15 is a sectional view on the line $a$—$a$ of Figure 11;

Figure 16 is a sectional view on the line $y$—$y$ of Figure 10;

Figure 17 is a perspective view, showing the threading dies and the means for operating the same;

Figure 18 is a view partly in section and partly in plan of the same;

Figure 19 is a sectional view on the line b—b of Figure 18;

Figure 20 is a perspective view of the threading dies;

Figure 21 is a sectional view on the line c—c of Figure 18;

Figure 22 is a sectional view on the line d—d of Figure 18;

Figure 23 is a sectional view on the line e—e of Figure 18;

Figure 24 is a view partly in section and partly in side elevation, showing a portion of the spindle-operating mechanism and the stop mechanism therefor;

Figure 25 is a perspective view of the forward end of the stop lever and showing a section of the operating pinion and the stop-lug for the spindle;

Figure 26 is a sectional view on the line g—g of Figure 25;

Figure 27 is a perspective view of the yielding latch at the end of the stop lever;

Figure 28 is a perspective view showing the spindle for inserting the rivet in the needle and the releasing mechanism for releasing the rivet from the turning spindle;

Figure 29 is a view partly in side elevation and partly in section of the head of the spindle, showing the means for clamping the rivet;

Figure 30 is a perspective view of the same, showing the parts separated;

Figure 31 is a perspective view of the means for cutting the ends of the rivet;

Figure 32 is a transverse sectional view of the same at a point just above the cutter;

Figure 33 is a sectional view on the line n—n of Figure 32;

Figure 34 is a side elevation of the means for cutting off the ends of the rivet;

Figure 35 is a front view of the same;

Figure 36 is a view partly in section and partly in plan of the cutting devices, showing the operating lever therefor;

Figure 37 is a sectional view on the line o—o of Figure 36;

Figure 38 is a sectional view through a needle with the rivet threaded into the same and showing the cutters positioned for cutting the rivet;

Figure 39 is a perspective view of one of the cutters and the supporting head therefor;

Figure 40 is a detail showing one of the guide rollers for directing the needle with the rivet therein to the cutters;

Figure 41 is a view partly in section and partly in side elevation, showing the riveting mechanism for heading the rivet.

Figure 11:
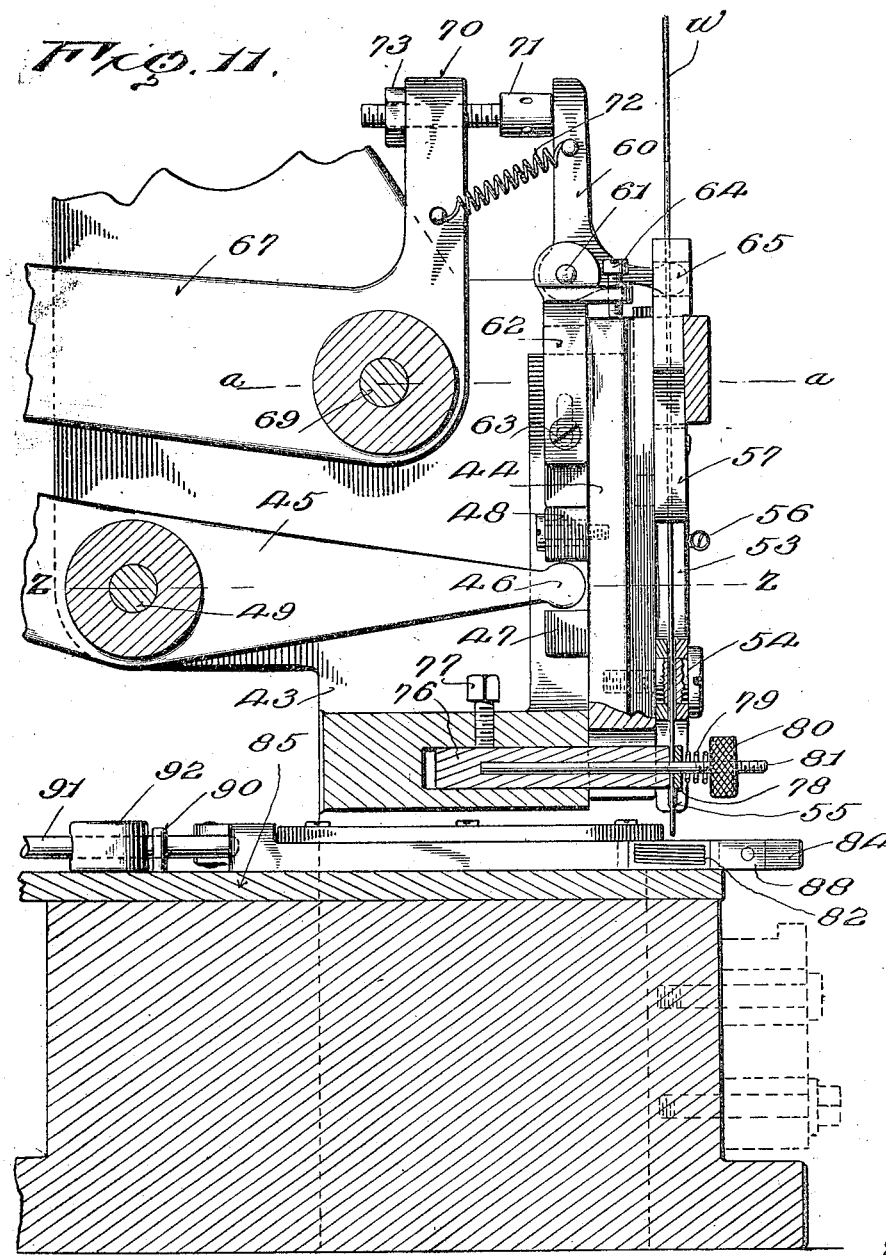
Figure 11 is an enlarged longitudinal sectional view, showing a portion of the means for feeding the wire forward, cutting the wire and threading the wire to form the threaded rivet.

In a patent filed by James M. Dayton, administrator of the estate of William H. Dayton, deceased, No. 1,381,810, granted June 19, 1921, and assigned to The Torrington Company, the assignee of the present invention, there is shown and described a latch needle making machine, to which the present invention has been applied. Many of the details of construction in the present machine are fully disclosed in said application and will only be referred to herein.

The machine consists broadly of a supporting frame on which is mounted to travel an endless carrier indicated at A in Figure 1 of the present drawings. Supported on said carrier is a plurality of needle chucks N, each of which is adapted to clamp a latch needle or a needle to which the latch is to be applied. This endless carrier travels intermittently and presents the needle chucks first to one station and then another.

At the station indicated at B in the drawings, a paper shim is formed and this shim is inserted between the cheeks of the needle. At the station indicated at C in the drawings, a latch is made from stock wire and shaped ready to be riveted to the needle proper. At the station indicated at D, the latch is inserted between the cheeks of the needle and alongside of the paper shim. At the station indicated at E', the cheeks of the needle with the latch inserted in position therein are tapped. At the station indicated at F' in Figure 1 of the drawings, a rivet is formed from stock wire and threaded and inserted in said openings in the cheek of the needle, after which the needle is carried to the next station F², where the ends of the rivet are severed, leaving just sufficient stock to form the heads of the rivet. The needle is then presented to the station G, where suitable devices operate to head the rivet; after which the needle is presented to the station I, where the hook is formed in the needle: and then to the station J where the stub end of the latch is broken off, thus finishing the needle except possibly for the grinding of the end of the latch.

The present invention is directed particularly to the devices located at stations E', F' and F², which devices accomplish the threading of the cheeks of the needles, the cutting of the rivet and the threading of the shank thereof, after which it is inserted in the needle and then the ends of the rivet are severed at a proper distance from the needle, so that the rivet may be headed down.

Before taking up more detailed description of the invention, attention is called to Figures 1ª and 1ᵇ, wherein a latch needle is shown, indicated at N'. Said needle is provided with a hooked end $n$ and with a latch $l$. The latch is formed with a recess $l'$ adapted to house the hooked end of the needle. The latch $l$ is inserted between the cheeks $n'$ and $n^2$ of the needle and the paper shim referred to above, is indicated at P.

A rivet R is provided with a threaded section adapted to engage threads on the cheeks $n'$, $n^2$, and after said rivet has been inserted it is subjected to a riveting action.

The present machine has particularly to do, as above noted, with the threading of the rivet and the threading of the cheeks of the needle; and then the inserting of the rivet in the threaded cheeks of the needle; and finally the riveting down of the heads of the rivets.

Referring more in detail to the drawings, the needle with the inserted latch is brought to the station E' and the chuck moves forward, positioning the needle on the support 1, bringing the openings formed in the cheeks of the needle directly beneath the tap 2, which is operated to form threads on the walls of the openings in said cheeks. The tap is carried by a spindle 3 mounted to rotate in a suitable bracket 4, carried by the frame of the machine. Said tap engages a recess 5 in the end of the spindle and is held therein by means of a sleeve 6 threaded on to the end of the spindle, the end of the spindle being provided with a vertical slit, so that the sleeve 6 which is tapered will force the ends of the spindle into gripping contact with the tap.

The spindle 3 is provided with a pinion 7, which is adapted to mesh with a gear 8 carried by a shaft 9 mounted to rotate in suitable bearings in this supporting bracket 4. Also mounted on the shaft 9 is a gear 10, adapted to mesh with a rack 11 carried by a bar 12. The bar 12 is mounted to slide freely in bearings in the bracket 4. Said bar 12 is connected at its inner end to a link 13, which in turn is pivoted to a lever 14 fixed to a shaft 15. Mounted on the shaft 15 is an arm 16, carrying a roller 17 and this roller 17 is adapted to bear against the cam 18, carried by the shaft 19. As this shaft rotates in the direction of the arrow shown in Figure 6, it will cause the link 13 to move endwise and this will force the rack bar endwise and rotate the shaft 9, which in turn will rotate the spindle 3 through the gear 8 meshing with the pinion 7.

The spindle 3 is provided with a fixed knurled disc 20. Mounted on a bracket 21 is an arm 22. Said arm 22 has forwardly projecting spring members 23 and 24. The member 24 is provided with a forked end 25 adapted to straddle the spindle directly beneath the disc 20 and the disc rests on said forked end. The member 23 overlies the disc 20 and bears on the upper face thereof. These members 23 and 24 are carried by a block 26. The block 26 is secured to the arm 22 by means of a set screw 27. The arm 22 is slotted, as indicated at 28, and the screw 27 passes through the slot into the block 26. Said block 26 also has a rib connection with the arm 22, which prevents the block from turning on the arm.

Arm 22 is mounted on an extension 33 which in turn is mounted in the forked upper end of the bracket 21. Journaled in the upper end of this bracket 21 is a shaft 29.

Loosely mounted on this shaft 29 is a collar 30. A lever 31 is fixed to the collar 30. Said collar 30 is held from endwise movement on the shaft 29 by means of a set screw 32, so that the lever 31 has a free movement on the shaft 29, so far as the collar connection thereto is concerned. The arm 22 has a rearward extension 33. Extending freely through said extension is a screw 34, threaded into a lug 35 carried by the lever 31. Threaded into said extension 33 is a screw 36, which bears freely against the upper face of the lug 35. By means of these screws 34 and 36 the angular position of the lever 31 relative to the arm 22 may be varied, but when once set this lever and the arm 22 turn as one.

Secured to the outer end of the lever 31 is a roller 37 adapted to engage a cam 38 carried by the shaft 39. This cam 38 is formed with an eccentric surface $a$, which operates to raise the roller 37 quickly, thus moving the spindle downward to a point where the tap has entered the openings in the cheeks of the needle and is just about ready to engage and form a thread thereon. The eccentric surface $b$ then comes into play and gradually moves the tap downward as it is rotated by the rack bar and thus the threads are formed in the cheeks of the needle. As soon as the openings in the cheeks of the needles have been tapped or threaded, then the roller 37 runs off from the eccentric surface $b$ and the spring 40 coming down on the rear end of the lever 31 raises the spindle carrying the tap.

The spring arms 23 and 24 form a yielding connection between the spindle and the operating lever 31 therefor, so that the positive movement of the cam surface $b$ will not injure the tap. If it is desired to remove the spindle carrying the tap for the purpose of inspection or otherwise, the set screw 27 is released and the block 26 slid rearwardly, which disengages the forked end 25 from the neck end of the spindle and then the spindle may be lifted endwise from its bearings. In other words, the yielding members 23 and 24 serve as the sole vertical support for the spindle carrying the tap and when these arms are disconnected from the spindle, it may be moved endwise and withdrawn from its bearings.

The screws 34 and 36 serve as a means for adjusting the relative positions of the arm 22 and the lever 31, as above noted, and this enables the working position of the spindle to be adjusted. In other words, by adjusting this arm 22 the tap may be brought just to the right position to begin its threading action, when the eccentric surface operates upon the roller 37.

The sliding rack bar 12 is moved to the left, as viewed in Figure 6, by the cam 18. Thus the spindle is positively rotated in a clockwise direction as it is lowered into the openings in the cheeks of the needle. A spring 40ᵃ is secured at one end to the bracket 21 and at the other end to a pin 41 on the link 13 and said spring serves as a means to force the rack bar to the right, as viewed in Figure 6, thus holding the roller 17 firmly against the cam 18, which not only serves as a positive means for reciprocating the rack bar, but also as a controlling means to permit the return of the rack bar and a rotating of the tap to withdraw it from the needle after the threading operation has been finished.

After the needle has been threaded and the tap withdrawn therefrom, then the needle chuck moves back and the endless carrier moves the chuck on to the next station, where again it is moved forward and the needle is positioned directly above a support 42 ready to receive a rivet. The means for forming the rivet and inserting the same in the threaded openings in the needle is shown more particularly in Figures 10 to 30 inclusive in the drawings.

The wire from which the rivet is formed is indicated at W in the darwings and this wire is led from a suitable supply to the station, where a measured length of wire is severed from the stock and a thread rolled on the severed section of wire.

Figure 12:
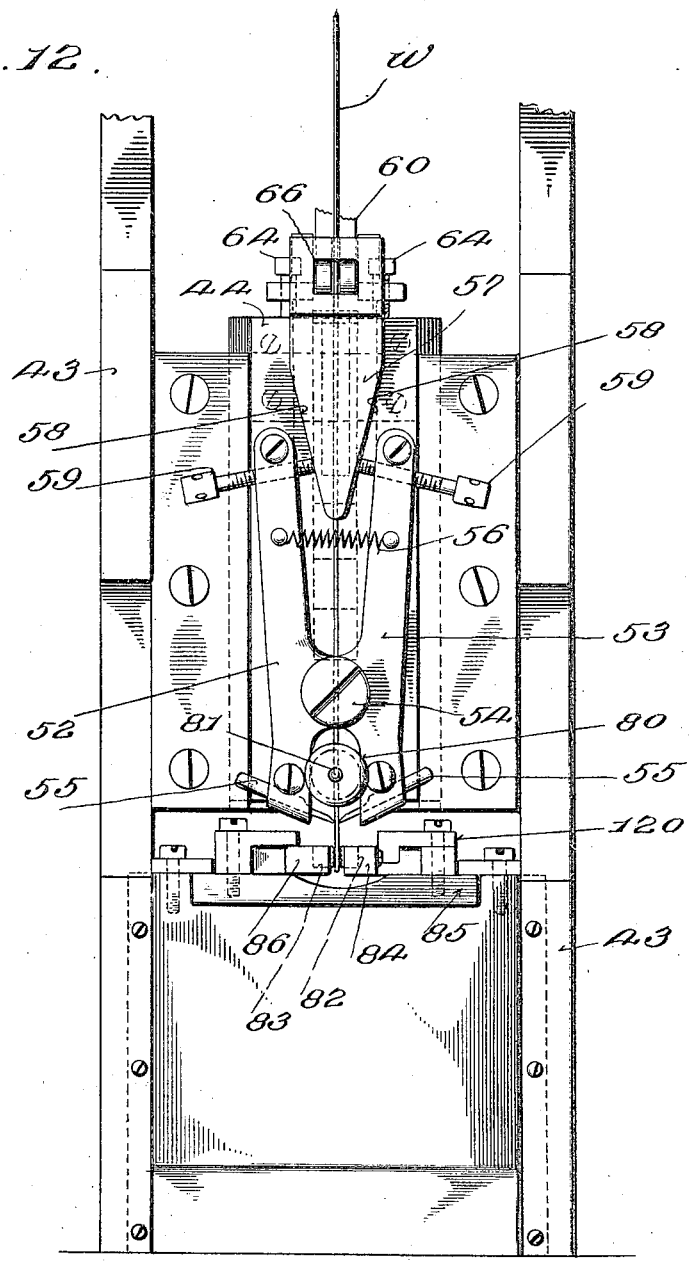
Figure 12 is a front view of a portion of the same mechanism.

The means for measuring off the length of wire and cutting the same is shown particularly in Figures 11, 12 and 13 of the drawings. Carried by the frame is a suitable bracket 43, on which is mounted a sliding head 44. This head 44 is raised and lowered by a lever 45, formed with a rounded head 46 adapted to extend between lugs 47 and 48, carried by the head 44, and one of which is adjustable to take up any loose play between the end of the lever and said lugs. This lever 45 is pivoted at 49 to the supporting bracket and carries a roller 50, adapted to co-operate with a cam 51 carried by the shaft 39.

Mounted on the sliding head 44 are two cutting levers 52 and 53. These levers are pivoted to turn about a supporting pivot 54, threaded into the sliding head. Each lever carries a cutter 55, adjacent the lower end thereof, and these cutters are used for severing the wire and also for gripping the wire to feed the same forward. The two levers 52 and 53 are turned toward each other at their upper ends by means of a spring 56 and the spring therefore operates to separate the cutters 55. The cutters are forced positively toward each other by a sliding cam 57, formed with inclined faces 58 adapted to engage adjustable screws 59, one carried by each lever.

The sliding cam 57 is mounted on the sliding head and is moved thereon by a rock lever 60. Said rock lever is pivoted at 61 to a bracket 62, secured to the sliding head 44, so that the rock lever 60 moves up and down with the sliding head. Said bracket 62 is secured to the sliding head by means of a set screw 63 passing through a slot, so that the bracket may be adjusted vertically and a stop screw 64 serves to hold the bracket in adjusted positions.

The rock lever 60 has a round headed arm 65 which extends into an opening 66 in the cam 57. The rock lever 60 is operated by means of a lever 67. This lever 67 is mounted on a sleeve 68 journaled on a shaft 69 carried by the bracket 43, see Figure 16. Said lever 67 has a vertically extending arm 70, which carries an adjustable screw 71, the head of which is adapted to bear against the rock lever 60. A spring 72 connected at one end to the arm 70 and at the other end to the rock lever 60, forces said rock lever against the head of said screw. A lock nut 73 serves to hold this screw in adjusted positions.

At the extreme rear end of the lever 67 is a roller 74 adapted to co-operate with a cam 75 carried by the shaft 39. Said cam 75 has an eccentric portion $d$, which operates to swing the lever 67 rapidly, after which said lever is held substantially at a dwell by the concentric surface $e$ of said cam 75, and finally said lever is given a quick movement by the projection $f$ on said cam, which brings about the cutting of the wire. The cam 51 has an eccentric surface $g$, which is in rear of the eccentric surface $d$, the shaft 39 turning in the direction of the arrow in Figure 13.

The wire indicated at W in the drawings is led through a suitable guiding opening in the cam 57, then through the pivot bolt 54 and then past the end of a post 76 secured to the bracket 43 by means of a set screw 77. A washer 78 is pressed against the wire by means of a spring 79, and the tension of the spring 79 is varied by means of the knurled nut 80 threaded on to the rod 81 carried by the post 76. This puts a tension on the wire and prevents the same from moving backwardly when the cam 57 and post 76 are raised.

As a result of the construction and timing of the cams 51 and 75, the following operation takes place, starting with both levers 45 and 67 in their fully raised positions at the forward ends thereof. The section $d$ of the cam 75 first comes into contact with the lever 67 raising the rear end thereof, which will force the cam 57 downwardly, separating the levers 52 and 53 and bringing the cutters 55 into gripping contact with the wire. This movement of the lever 67 by the section $d$ of the cam, is not sufficient to sever the wire. The section $e$ of the cam 75 is substantially concentric and holds the cutters in gripping contact on the wire. The lever 45 is then swung by the section $g$ of the cam 51 and this moves the sliding head 44 downwardly, bodily carrying the cutting levers and thus feeding the wire forward, drawing said wire through the openings in the pivot bolt for the levers and the cam 57.

When the wire has been fed forward to the desired extent, which is determined by the throw of the cam 51, then the lever 67 is given a further throw by means of the projection $f$ on the cam 75 and this results in the severing of the wire. As soon as the wire is severed the lever 67 is moved in the opposite direction, which lifts the cam 57 and permits the cutters 55 to separate and free the wire, after which the lever 45 is moved and raises the sliding head 44, thus shifting the cutters bodily upwardly to their extreme upper position.

It will be noted that when the lever 67 is in position for holding the cutter in gripping contact with the wire $w$, as shown in Figure 13 of the drawings, the upper arm of the rock lever 60 is substantially vertical, and, therefore, the sliding head 44 may move down to bodily move the cutter and feed the wire without causing the cam 57 to have any further movement relative to the levers 52 and 53, which would cause a severing of the wire.

The wire is placed between the threading dies and the threading dies caused to grip the section from which the rivet is to be formed before this section of the wire is severed from the wire stock. The gripping of the wire and the rolling of the thread thereon is accomplished in the following way: The threading die 82 is mounted on a sliding bar 84. Said bar in turn is mounted on a sliding plate 85. Pivoted on this sliding plate 85 is a lever 86, which carries the other threading die 83. The threading dies are provided with tapered ends and each die sets in a recess formed therefor in its supporting part and rests on a plate 87 carried by said supporting part. The threading dies are held in place by clamping plates 88.

The sliding bar 84 carrying the die 82 is moved by a spring 89 rearwardly, as viewed in Figure 18, until the rear end of said bar engages a stop pin 90. Said bar is moved in the opposite direction by means of a rod 91, which freely passes through a guiding lug 92 carried by the sliding plate 85. Said rod is connected at its rear end with a lever 93, pivoted at 94 to a supporting bracket 95 carried by the frame of the machine. This lever 93 intermediate its ends carries a roller 96 adapted to engage a cam 97 carried by the shaft 39. The rod 91 is formed in sections which are adjustably connected, so that the rod may be lengthened or shortened as desired.

The lever 86 is swung on its pivot 98 by means of a spring 99. This spring is connected to an arm 100 pivoted at 101 to the sliding plate 85. A screw 102 passing through a lug in the arm, engages the edge of the plate and serves as a means for adjusting the arm 100, thereby increasing the tension of the spring 99, as desired. The movement of the lever 86 about its pivot 98 is limited by a stop screw 103. Said stop screw is threaded through a suitable lug 104 carried by the sliding plate 85 and is adapted to engage the side edge of said lever 86.

The lever at its extreme inner end carries a roller 105 adapted to bear against the straight face 106 of a pivoted arm 107. This arm 107 is pivoted at 108 to the frame of the machine. Said arm on the opposite side from its straight face 106 is formed with cam faces 109. The arm 107 is swung about its pivotal support by a rock lever 110, pivoted at 111 to the frame of the machine. Said rock lever carries a roller 112 which cooperates with a face cam 113 carried by the shaft 39.

The sliding plate 85 is provided with a bracket 114 adapted to engage a stop screw 115 carried by a lug 116 supported by the bracket 43 at one end of its travel. A spring 117 engaging at one end a pin on the frame and at the other end a pin on the sliding plate 85, tends to force the sliding plate in a rearward direction. A second stop screw 118 carried by the bracket 43 also is adapted to engage the bracket 114 and prevent any overthrow of the parts.

The swinging of the arm 107 moves the lever 86 on its pivot and separates the dies 82 and 83; while in this position the section of wire from which the rivet is to be formed is inserted between said dies. Then the cam 113 moves so as to cause the arm 107 to be released and this permits the spring 99 to move the lever 86 to cause the die 83 to move over and against the wire section and grip the same, after which the wire is severed from the main stock of wire. After this occurs, then the cam 97 operating upon the lever 93, moves the rod 91 forward. The spring 117 is of greater tension than the spring 89 and as a result the bar 84 will be moved forward, stretching the spring 89, while the slide plate 85 will remain stationary, held by the spring 117. This forward movement of the bar 84 causes the dies 82 and 83 to roll a thread on the rivet.

As soon as the head 119 of the bar 84 strikes the guide plate 120 for said bar, further endwise movement of the bar 84 is prevented and now the whole slide plate 85 will move forward, stretching the spring 117. This carries both the bar 84 and the lever 86 forward, without any relative movement between the two and it brings the rivet with the thread formed thereon underneath the spindle head, which is to grip the rivet and insert the same in the threaded openings in the needle. After the rivet section has been gripped by the head on the spindle, by means which will be described hereinafter, then the arm 107 is again swung by the cam 113, which moves the rock lever 110 in a clockwise direction against the tension of the spring 121. This swinging of the lever 86 will cause the dies to release their grip on the rivet and then the cam 97 permits the lever 93 to move to the left, as viewed in Figure 17, and the spring 117 will retract the slide plate 85 and when said slide plate reaches the rear end of its movement, then a further movement of the rod 91 will permit the spring 89 to retract the bar 84 and position the parts for the next threading movement of the dies.

It will be noted that the straight face 106 permits the sliding plate 85 to move, carrying with it bodily the lever 86, without producing any swinging movement of the lever on its pivot. The depth of the thread rolled into the rivet may be varied by varying the tension of the spring 99, which determines the pressure of the dies against the wire forming the rivet. The stop 103 limits the movement of the lever 86 and prevents the dies coming together, if they are out of control of the lever 107.

After the thread has been formed on the rivet, said rivet is carried bodily forward by the dies 82 and 83, as above described, and brought underneath the spindle which inserts the rivet in the threaded opening in the needle. Referring to Figures 10 and 28 of the drawings, the means for inserting the rivet consists of a spindle 122 which carries a clamping head 123 at the lower end thereof. This spindle is mounted to rotate and to move endwise in a bracket extension 124 carried by the bracket member 43. The spindle is provided with a pinion 125, which meshes with a gear 126 fixed to the shaft 127 also journaled in the bracket extension 124. The pinion 125 is elongated, so that it may have a sliding connection with the gear 126.

Mounted on the shaft 127 and freely turning thereon is a belt wheel 128, operated by a belt 129 which runs over pulleys 130. A spring 131 forces a friction plate 132 against the pulley 128, so that the pulley 128 is forced into frictional contact with the gear wheel 126, so that normally the gear wheel will rotate with the pulley and said gear wheel will rotate the pinion 125 and thus turn the spindle 122 and the clamping head 123 at the lower end thereof.

The spindle 122 is moved endwise by an arm 133. The arm 133 is formed as a part of the collar 134, pressed on to the sleeve 135. This sleeve is fixed to a shaft 136 mounted in suitable bearings in the bracket 43, see Figure 16 of the drawings. Carried by the arm 133 are two yielding members 137 and 138. The member 138 has a forked end which engages the neck of the spindle 122 just below the disc 139 thereon. The upper member 137 bears against the upper face of this disc 139. Loosely mounted to turn on the shaft 136 is a lever 140. This lever 140 carries a roller 141, which bears against a cam 142 on the shaft 39. A spring 143 holds the roller in contact with the cam.

The arm 133 has a rearward extension 144, through which is threaded a set screw 145 adapted to bear against the face of the lug on the lever 140. A set screw 146 passes freely through the extension 144 and is threaded into the lug on this lever. By means of these screws the relative positions of the arm 133 and the lever 140, may be adjusted.

The clamping head at the lower end of the spindle 122 is shown in detail in Figures 28 to 30 inclusive. Said clamping head 123 is provided with spaced members 147, between which is fastened a U-shaped clamping member 148 held in place by a pin 149. Pivotally connected to the main part of the clamping head is a swinging jaw 150, which is pivoted to the clamping head at 151. Said clamping jaw is formed with a lip 152 adapted to extend into the open face of the U-shaped clamp 148 and engage the upper end of the rivet as clearly shown in Figure 29. A spring 153 is seated in a socket in the main portion of the clamping head and bears against an upwardly extending arm 154 of the clamping jaw and turns said clamping jaw so as to cause the lip to clamp the rivet and firmly hold the same.

Mounted on the spindle is a swinging latch 155, rotated by a spring 156 in a direction so as to cause the nose of the latch to swing behind the arm 154 and hold said arm with the clamping lip withdrawn from the U-shaped slot in the clamping member 148. While in this position the dies carrying the threaded rivet move up underneath the clamping head and the lever 140 is swung so as to lower the clamping head on to the rivet. After the head has been lowered over the rivet, then an arm 157 is swung so as to cause an inclined part 158 to engage the latch, force the same sidewise and release the clamping jaw, so that the spring 153 may cause the jaw to grip the rivet. After the rivet has been gripped by the clamping head, then the dies are separated and release the rivet. This position of the rivet is directly over the holes in the cheek of the needle, which is supported by the needle support 42 at this time.

The spindle 122 is moved still further downwardly by the lever 140 and causes the threaded rivet to enter the threaded openings in the cheeks of the needle. At this time the spindle is rotated so that the rivet will be turned into the threaded openings in the cheeks of the needle. After the rivet has been fully turned into the needle, then the arm 157 is again moved forward and the lug 160 formed thereon engages the arm 154, forcing the same toward the main portion of the clamping head, so that the latch will drop in behind the arm and hold the clamping jaw away from the co-operating clamping member. The arm 157 is formed with a recess section 161, so that the latch has free movement to swing behind the arm.

At the time that this arm 157 is moved inwardly to release the clamp from the rivet, the spindle has stopped its rotation through the action of a stop mechanism, which will be hereinafter described. First the means for operating the arm 157 will be described. This arm is pivotally carried by one of the bracket members 43 and a spring 162 normally springs the arm away from the clamping head. A rock lever 163 is pivotally mounted in the bracket 43, and this rock lever is operated by a lever 164 pivoted at 165 to said bracket 43. At the rear end of the lever 164 is a roller 166, which co-operates with a cam 167, which has two projections 168 and 169. One of these projections operates upon the lever 164 to swing the arm 157 to bring it into the path of the latch, so as to release the jaw and the other projection operates upon the arm 157 to force the same forward to engage the arm 154 of the clamping jaw for opening the same.

The lever 164 carries an adjustable screw 170, which bears against the rock lever 163 and this serves as a means for adjusting the movement of the arm 157.

The brake mechanism for stopping the movement of the spindle 122 consists of a lever 171 pivoted at 172 to the bracket 43. This lever carries a roller 173 at its rear end, which is held against a cam 174 on the shaft 39 by means of a spring 175, see Figure 24.

On the upper face of the gear 126 is a lug 176. Near the outer end of the lever 171 is a pivoted member 177 provided with a hardened plate 178, adapted to engage the lug 176. A spring 179 bears against the upper part of this pivoted member and said pivoted member has a rearward extension 180 adapted to engage the under face of the lever 171. The spring forces the outer end of the pivoted member downwardly until the extension is brought into contact with the lever.

The purpose of this yielding member is to provide a yielding means should the lever be swung to stop the spindle in such timing as to cause the outer end to come down on top of the lug 176. Said lever is forced downward into position for stopping the pinion by means of a cam and this yielding member is essential, so as to permit the full throw of the lever even though the end of the lever strikes this lug. Said end will yield as above stated, and the member will slip off from the lug and then as the lug comes around in its rotation it will strike the end of the lever and stop the rotation of the spindle. The position of the lug is such as to stop the rotation of the spindle when the clamping jaw is in proper position to be engaged by the arm 157.

From the above it will be apparent that this spindle rotates and is moved endwise. The clamping jaw comes down over the end of the rivet where the latch is caused to strike the arm 157, release the clamping jaw so that the rivet is gripped by the clamping jaw and firmly supported by the clamping head; then the spindle continues its downward movement, turning the threaded rivet into the threaded openings in the needle; and finally the stop lever swings down and stops the movement of the spindle; after which the arm 157 is moved forward to release the clamping jaw. Then the head moves upwardly away from the rivet, leaving the rivet threaded into the needle and extending through the latch carried by the lever.

The endless conveyor A now moves the needle chuck another step forward, bringing it to the station where the ends of the rivet are to be cut off, leaving only sufficient stock in the rivet for the forming of the rivet heads. At the rivet-cutting station the needle chuck is again moved forward and as the needle chuck moves forward the ends of the rivet engage a guide roller 181. This guide roller is freely mounted on a supporting bracket 182 carried by the main bracket 183, on which the cutters are mounted. The roller is formed with a central groove 184 and with radial wings 185. The rivet passes between adjacent radial wings which serve to guide the needle, directing the body part of the needle in the groove 184, so that the groove will assist in the placing of the needle particularly as to its up and down positions.

Mounted on the bracket 183 is an upper cutter 186 and a lower cutter 187. These cutters are stationary and are clamped in position on a bracket by suitable clamping screws 188. Each cutter consists of a supporting block 189 and a cutting blade 190, which is secured thereto by suitable screws 191. Mounted to slide in the bracket 183 is an upper cutter 192, which co-operates with the cutter 186 and a lower cutter 193, which co-operates with the lower cutter 187. These movable cutters also consist of supporting blocks similar to the blocks 189 and cutting blades similar to the blades 190. The movable blades are forced away from the stationary blades by means of springs 194, which normally press said movable cutters outwardly. The cutters are moved inwardly by means of an arm 195 carrying screws 196, one for each movable cutter.

The arm 195 is mounted at the lower end of a shaft 197 journaled in suitable bearings in the bracket member 183. At the upper end of the shaft there is secured an arm 198. The arm 198 is split and is caused to clamp the shaft by means of a clamping bolt 199. The free end of the arm 198 is formed with a projecting nose 200 adapted to engage a cam 201 on the shaft 39. The arm 198 is provided with an adjustable stop finger 202 secured to the arm by a bolt 206 passing through a slot 204 in the stop finger. The lever 198 is swung by a spring 205 in a direction so as to hold the nose 200 in contact with the cam 201. The cam positively forces the lever in the opposite direction. The swinging movements of the lever 198 when out of contact with the cam projection, are limited by the stop finger 202. The screws 196 are capable of being adjusted and are held in adjusted position by lock nuts 206.

When the cutters are separated from each other the needle is moved forward and the rivet carried between the upper and lower cutters, as clearly shown in Figure 38 of the drawings, wherein the rivet is indicated at R. After the rivet has been positioned between the cutters, the lever 198 is swung by the cam 201, which forces the movable cutters inwardly, severing the rivet above and below the cheeks of the needle. The guiding wheel 181, by means of the groove 184 positions the needles, so that just the right amount of stock is left in the rivet above and below the needle, so that at the next station, where the heads are formed, rivet heads will be formed flush with the side cheeks of the needle, or at least will not project beyond the side cheeks of the needle.

After cutting the rivet to proper length, the needle is then withdrawn by the outward movement of the chuck and the carrier A carries the chuck to the next station where the rivet is headed. A riveting mechanism is shown more particularly in Figure 40 of the drawings. This riveting mechanism per se forms no part of the present invention, but is shown and described in the application filed jointly by James M. Dayton, administrator of the estate of William H. Dayton, deceased, and John A. Calder, Serial No. 265,541, filed December 6th, 1918.

Briefly, it may be stated that this riveting mechanism consists of riveting hammers 207 and 208, which riveting hammers are carried by jaws 209 and 210 respectively, and these jaws are vibrated by means of a cross head 211 which is connected to the jaws by links 212 and 213 respectively. The cross head is moved back and forth by a rod 214, adapted to engage a crank pin 215 carried by a shaft 216, rotated by a belt wheel 216' through intermeshing bevel gears 218 and 219. The crank pin 215 may be shifted radially of the shaft by means of a cam member 220, which is raised and lowered by a bell crank 221 having a roller 222 co-operating with the cam groove 223 in a disc 224 on the shaft 39.

These riveting hammers strike light blows against the ends of the rivet and cause said ends to be headed and seated in recesses in the side faces of the cheeks of the needle. During the riveting operation, the central portion of the rivet is also enlarged, which makes a more efficient bearing for the latch. Also the thread is upset making it impossible for the thread to unscrew on account of the upsetting of the screw in the center of the rivet acting the same as a right and left hand thread in the cheek of the needle. It will be understood, of course, that the opening in the latch is slightly larger than the rivet, so that said latch turns freely upon the rivet.

After completing the riveting operation, then the needle is presented to the station where the hook is bent and finally to the station where the stub end of the latch is broken off.

From the above it will be apparent that there has been provided a latch needle making machine wherein the cheeks of the needle are formed with threaded openings and a rivet is also formed from stock metal which is threaded, said rivet is turned into the threaded openings; after which the ends of the rivet are cut off both above and below the needle and said ends of the rivet headed. This forms a very durable rivet for a latch needle, insuring the holding of the rivets in place not only during the heading operation so that the rivet will be properly headed at both ends, and showing a rivet which can not unscrew on account of the thread being upset which takes the place of a right and left hand thread if same were possible to be put in the cheek of the needle, but during the actual use of the needle. While the rivet threading and rivet forming devices have been shown in connection with a machine wherein the latch is formed, and also a machine which forms a paper shim and inserts the same between the cheeks of the needle, it will be obvious from certain aspects that the means for threading the openings in the needle, and also the means for forming and threading the rivet, may be used in connection with other devices.

It will also be obvious from certain aspects, that the means for forming a threaded rivet and inserting the same in the needle, may be used in conjunction with other devices.

It is also obvious that minor changes in the details of the construction and the arrangement of the parts may be made without departing from the spirit of the invention as set forth in the appended claims.

Having thus described my invention, what I claim as new and desire to secure by Letters Patent, is:—

1. The combination of means for supporting a needle having spaced cheeks with openings therein, means for threading said openings, and means for inserting a threaded rivet in said openings and through a latch in the needle while held by said supporting means.

2. The combination of means for supporting a needle having spaced cheeks with openings therein, means for threading said openings, means for inserting a threaded rivet in said openings and through a latch in the needle, while held by said supporting means, and means for cutting off the ends of said rivet.

3. The combination of means for supporting a needle having spaced cheeks with openings therein, means for threading said openings, means for inserting a threaded rivet in said openings and through a latch in the needle while held by said supporting means, means for cutting off the ends of said rivet, and means for heading the ends of said rivet.

4. The combination of means for supporting a needle having spaced cheeks with openings therein, means for threading said openings, means for forming and threading a rivet, means for inserting said threaded rivet in the threaded openings in said cheeks and through a latch in the needle while held by said supporting means.

5. The combination of means for supporting a needle having spaced cheeks with openings therein, means for threading said openings, means for forming and threading a rivet, means for inserting said threaded rivet in the threaded openings in said cheeks and through a latch in the needle while held by said supporting means, and means for cutting off the ends of said rivet.

6. The combination of means for supporting a needle having spaced cheeks with openings therein, means for threading said openings, means for forming and threading a rivet, means for inserting said threaded rivet in the threaded openings in said cheeks and through a latch in the needle while held by said supporting means, means for cutting off the ends of said rivet, and means for heading the ends of said rivet.

7. The combination of means for supporting a needle having spaced cheeks with openings therein, means for threading said openings, means for feeding a wire forward, means for threading the wire, means for cutting off said wire after it has been inserted in the threading means, means for operating the threading means to form a rolled thread on said wire, and means for inserting said threaded section of the wire in the threaded openings in the needle.

8. The combination of means for supporting a needle having spaced cheeks with openings therein, means for threading said openings, means for feeding a wire forward, means for threading the wire, means for cutting off said wire after it has been inserted in the threading means, means for operating the threading means to form a rolled thread on said wire, means for inserting said threaded section of the wire in the threaded openings in the needle, means for cutting off the ends of said wire after it has been inserted in the needle, and means for heading the ends of the wire to form a rivet for holding a latch in the needle.

9. A latch needle making machine including in combination, means for feeding a wire forward for forming a rivet, means for threading the wire, means for cutting off the wire after it has been engaged by said threading means, means for inserting the threaded rivet in the threaded cheeks of a needle having a latch therein, and means for releasing the threading means from the rivet after said rivet has been clamped by said inserting means.

10. A latch needle making machine including in combination, means for feeding a wire forward, threading dies for engaging opposite sides of the wire, means for cutting off the wire after it has been engaged by said dies, means for moving one die relative to the other for rolling a thread on the wire, and means for inserting the threaded wire in threaded openings in the needle for securing the latch to the needle.

11. A latch needle making machine including in combination an inserting spindle, means for feeding a wire forward, threading dies for engaging opposite sides of the wire, means for cutting off the wire after engaged by said threading dies, means for moving one threading die relative to the other for rolling a thread on the wire, and means for moving both of said dies bodily forward to position the threaded wire underneath an inserting spindle.

12. A latch needle making machine including in combination, means for feeding a wire forward, threading dies for engaging opposite sides of the wire, means for cutting off the wire after engaged by said threading dies and inserting spindle, means for moving one threading die relative to the other for rolling a thread on the wire, means for moving both of said dies bodily forward to position the threaded wire underneath an inserting spindle, a clamping head carried by said spindle, means for moving the clamping head down over the wire and means for causing the same to clamp the wire and for subsequently releasing the wire from the threading dies.

13. A latch needle making machine including in combination an inserting spindle, threading dies for threading a wire to form a rivet, a supporting slide for said threading dies, a lever pivoted on said slide and carrying one of said dies, a bar movable endwise on the slide and carrying the other die, a stop for limiting the movement of the bar, a spring for retracting the slide, a spring of less tension for retracting the bar, and an endwise movable rod adapted to engage said bar for moving the same to thread the rivet and for moving the slide to carry the rivet forward to a position beneath an inserting spindle.

14. A latch needle making machine including in combination, an inserting spindle, threading dies for threading a wire to form a rivet, a supporting slide for said threading dies, a lever pivoted on said slide and carrying one of said dies, a bar movable endwise on the slide and carrying the other die, a stop for limiting the movement of the bar, a spring for retracting the slide, a spring of less tension for retracting the bar, an endwise movable rod adapted to engage said bar for moving the same to thread the rivet and for moving the slide to carry the rivet forward to a position beneath an inserting spindle, a clamping head carried by the spindle adapted to clamp the wire, and means for moving the pivoted lever to release the dies from the wire after it has been clamped by said head.

15. A latch needle making machine including in combination, an inserting spindle having a clamping head thereon including a yielding clamping jaw, a latch for holding the jaw open, an arm for releasing the latch and for moving the jaw to position the same to be engaged by the latch, and means operating upon said arm to cause the latch to release the jaw to clamp the rivet for inserting the same in the cheeks of the needle and for moving the jaw to cause the latch to engage the same and hold the jaw away from the rivet after it has been threaded into the needle.

In testimony whereof I affix my signature in the presence of two witnesses.

JOHN A. CALDER.

Witnesses:
 DENIS HILDRETH,
 ETHEL M. MILLS.